US009779526B2

(12) United States Patent
Chang et al.

(10) Patent No.: US 9,779,526 B2
(45) Date of Patent: Oct. 3, 2017

(54) METHOD, SYSTEM AND APPARATUS FOR DETERMINING AREA OF A PIXEL COVERED BY A SCALABLE DEFINITION FOR A CHARACTER

(71) Applicant: CANON KABUSHIKI KAISHA, Tokyo (JP)

(72) Inventors: Albert Chang, Lindfield (AU); Michael Gerard McCosker, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 14/089,073

(22) Filed: Nov. 25, 2013

(65) Prior Publication Data

US 2014/0146073 A1     May 29, 2014

(30) Foreign Application Priority Data

Nov. 27, 2012  (AU) ................................. 2012258407

(51) Int. Cl.
*G06T 11/60*       (2006.01)
(52) U.S. Cl.
CPC .................................... *G06T 11/60* (2013.01)
(58) Field of Classification Search
CPC ......... G06T 11/60; G06T 11/203; G06T 11/20
USPC .................................................. 345/611, 614
See application file for complete search history.

(56) References Cited

U.S. PATENT DOCUMENTS

| 5,101,436 | A | * | 3/1992 | DeAguiar | ............... G06T 17/00 345/503 |
| 5,490,238 | A | * | 2/1996 | Watkins | ................ G06T 15/503 345/422 |
| 5,872,902 | A | * | 2/1999 | Kuchkuda | ............. G06T 15/503 345/615 |
| 5,977,864 | A | * | 11/1999 | Buonpane | ................. G06F 7/02 340/146.2 |
| 6,046,751 | A | * | 4/2000 | Kato | ........................ G09G 5/02 345/501 |
| 6,104,407 | A | * | 8/2000 | Aleksic | ................... G06T 15/10 345/422 |
| 6,337,686 | B2 | | 1/2002 | Wong et al. | |
| 6,429,877 | B1 | | 8/2002 | Stroyan | |
| 6,437,793 | B1 | | 8/2002 | Kaasila | |
| 7,110,003 | B2 | | 9/2006 | Doan | |

(Continued)

FOREIGN PATENT DOCUMENTS

AU              765466 B2    9/2003
AU         2009222438 A1    4/2011

*Primary Examiner* — Mark Zimmerman
*Assistant Examiner* — Jonathan M Cofino
(74) *Attorney, Agent, or Firm* — Canon USA, Inc. I.P. Division

(57) ABSTRACT

A method of determining a coverage area of a pixel covered by a scalable path definition for a character, is disclosed. An edge direction for each edge of the scalable path definition intersecting the pixel is received. A fragment area is determined for each of the intersecting edges, each of the fragment areas representing an area of the pixel located to a side of a corresponding edge. The side of the corresponding edge is selected according to a direction of the corresponding edge. The coverage area of the pixel is determined based on a sum of the fragment areas, the sum of the fragment areas having a value greater than a total area of the pixel.

13 Claims, 19 Drawing Sheets

(56) References Cited

U.S. PATENT DOCUMENTS

| | | | | |
|---|---|---|---|---|
| 2001/0013873 A1* | 8/2001 | Wong | ................... | G09G 5/28 |
| | | | | 345/629 |
| 2002/0145616 A1* | 10/2002 | Doan | ................... | G06T 11/40 |
| | | | | 345/629 |
| 2003/0059114 A1* | 3/2003 | Naoi | ................... | G06T 15/005 |
| | | | | 382/181 |
| 2005/0007381 A1* | 1/2005 | Chen | ................... | G06T 11/203 |
| | | | | 345/613 |
| 2007/0139440 A1* | 6/2007 | Crow | ................... | G06T 11/001 |
| | | | | 345/614 |

* cited by examiner

=

METHOD, SYSTEM AND APPARATUS FOR DETERMINING AREA OF A PIXEL COVERED BY A SCALABLE DEFINITION FOR A CHARACTER

THE REFERENCE TO RELATED PATENT APPLICATION(S)

This application claims the benefit under 35 U.S.C. §119 of the filing date of Australian Patent Application No. 2012258407, filed 27 Nov. 2012, hereby incorporated by reference in its entirety as if fully set forth herein.

FIELD OF INVENTION

The present invention relates to the rasterisation of scalable path definitions for the purpose of displaying the path definitions on a computer screen. The present invention also relates to a method and apparatus for determining area of a pixel covered by a scalable path definition, and to a computer program product including a computer readable medium having recorded thereon a computer program for determining area of a pixel covered by a scalable path definition.

DESCRIPTION OF BACKGROUND ART

The display of text on pixel based computer displays requires a text definition to be in a rasterised form. In the past, characters to be displayed were stored on a computer device as a representation known as a "bitmap font". A bitmap font provides a raster definition for each text character for required display sizes. Pixel elements for each raster definition are copied to memory corresponding to a display buffer for a display. In order to support multiple display sizes, scalable path definitions for the characters may be used and rasterisation is performed at time of usage at a desired display size.

One method of rasterisation that produces two-levels of intensity value is known as "point-sampling rasterisation". The point-sampling rasterisation method produces a rasterisation by evaluating, at positions corresponding to pixel centres, whether the pixel centres are inside or outside of the outline (or "path") defining a scalable path definition. Depending on whether the position is inside or outside the outline for the path definition, two different intensity values are assigned. Two-level intensity rasterisation has a limited number of intensity values and is often seen to be of a lower quality, as artefacts such as aliasing are often present. To improve quality, a method of rasterisation known as anti-aliased (AA) rasterisation may be employed.

One such method of anti-aliased rasterisation is known as "super-sampling". Super-sampling uses multiple sampling positions to determine intensity value of each pixel. By utilising multiple samples per pixel, multiple intensity values can be derived for each pixel location. While super-sampling is effective in minimising artefacts relating to monochromatic rasterisation, such a method is expensive in terms of memory usage. Super-sampling is also slow with increasing multiplication values. Typically, a high quality anti-aliased rasterisation method utilises multiplication factors of at least eight in a horizontal and vertical direction. Such an anti-aliased rasterisation method is known as "8×8AA".

Sampling provides an approximation of area of a pixel covered (or "coverage area") by a character, whereby increasing sampling rate increases precision of a result. Theoretically, to increase the sampling rate to an infinite value would allow a rasterisation producing exact area coverage. However, using an infinite number (or a very large number) of samples is costly in terms of processing performance.

Area calculation methods that are not based on point sampling attempt to determine the coverage area for a pixel by firstly identifying a sub-shape corresponding to each pixel. The sub-shapes are pixel sized shapes that correspond to a single tile of a rendered shape where each tile is equal to the pixel size. When processing each pixel, all edges entering the pixel must be known at time of processing and geometric area of the shape is determined using a set of predetermined formulas. Due to its inherent complexity, such area calculation methods operate only on very primitive shapes. For example, it is possible to use such methods for processing triangular shapes used in 3D graphics accelerators. When triangular shapes are being rasterised, possible sub-shapes that may be produced include triangles, rectangles, squares (i.e., corresponding to pixels inside the shape) and trapeziums. While effective with rasterisation of simple shapes, area calculation methods require complex shapes to be reduced down to triangles before processing can be performed efficiently.

Other rasterisation methods rely on edge information associated with a pixel being available when the pixel is rasterised. Such methods, often use a scanline rendering algorithm to raster each row of output. When a pixel in a row is rasterised, edges intersecting the pixel are examined in order to determine area contribution. Depending on direction of the edges, calculated areas corresponding to each edge are either added or subtracted to reach a resulting coverage area. Edges corresponding to a path being rasterised need to be vectorised, and then sorted for each row. Sorting vectorised edges, checking the direction of edges at each pixel and making a determination whether to add or subtract, causes additional overhead which impacts performance.

SUMMARY OF THE INVENTION

It is an object of the present invention to substantially overcome, or at least ameliorate, one or more disadvantages of existing arrangements.

According to one aspect of the present disclosure there is provided a method of determining a coverage area of a pixel covered by a scalable path definition for a character, the method comprising:

receiving an edge direction for each edge of the scalable path definition intersecting the pixel;

determining a fragment area for each of the intersecting edges, each of the fragment areas representing an area of the pixel located to a side of a corresponding edge, the side of the corresponding edge being selected according to a direction of the corresponding edge; and determining the coverage area of the pixel based on a sum of the fragment areas, the sum of the fragment areas having a value greater than a total area of the pixel.

According to another aspect of the present disclosure there is provided an apparatus for determining a coverage area of a pixel covered by a scalable path definition for a character, the apparatus comprising:

means for receiving an edge direction for each edge of the scalable path definition intersecting the pixel;

means for determining a fragment area for each of the intersecting edges, each of the fragment areas representing an area of the pixel located to a side of a corresponding edge, the side of the corresponding edge being selected according to a direction of the corresponding edge; and means for determining the coverage area of the pixel based on a sum of the fragment areas, the sum of the fragment areas having a value greater than a total area of the pixel.

According to still another aspect of the present disclosure there is provided a system for determining a coverage area of a pixel covered by a scalable path definition for a character, the system comprising:

a memory for storing a data and a computer program;

a processor coupled to the memory for executing said program, said program comprising instructions for:

receiving an edge direction for each edge of the scalable path definition intersecting the pixel;

determining a fragment area for each of the intersecting edges, each of the fragment areas representing an area of the pixel located to a side of a corresponding edge, the side of the corresponding edge being selected according to a direction of the corresponding edge; and determining the coverage area of the pixel based on a sum of the fragment areas, the sum of the fragment areas having a value greater than a total area of the pixel.

According to still another aspect of the present disclosure there is provided a non-transitory computer readable medium having a computer program stored thereon for determining a coverage area of a pixel covered by a scalable path definition for a character, the program comprising:

code for receiving an edge direction for each edge of the scalable path definition intersecting the pixel;

code for determining a fragment area for each of the intersecting edges, each of the fragment areas representing an area of the pixel located to a side of a corresponding edge, the side of the corresponding edge being selected according to a direction of the corresponding edge; and code for determining the coverage area of the pixel based on a sum of the fragment areas, the sum of the fragment areas having a value greater than a total area of the pixel.

Other aspects are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1A:
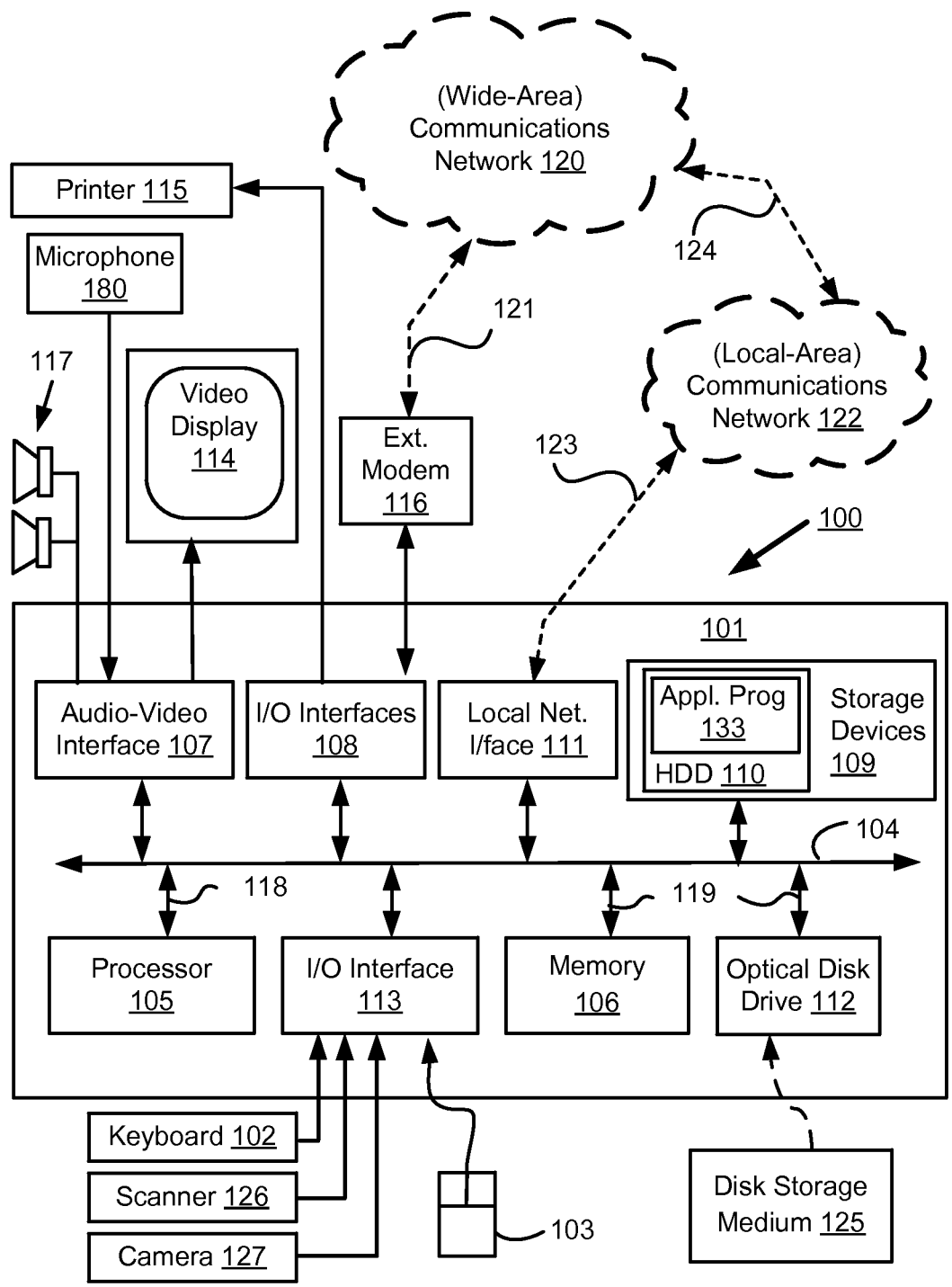
FIGS. 1A and 1B form a schematic block diagram of a general purpose computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

In methods described below, scalable path definitions are used to represent a character to be rasterised. The scalable path definitions are represented as a sequence of two-dimensional co-ordinates that form outlines of enclosed shapes. The two-dimensional co-ordinates may form control points corresponding to line segments (also known as "edges") or may correspond to the control points forming a Bezier curve segment.

The ordering of the co-ordinates is specified in a particular order which has implications on which side of a shape is to be filled. The path definitions within a font should conform to one ordering semantic. When a path definition is specified in "clockwise ordering", the control points are specified in the clockwise order in a two-dimensional space. The area inside the outline of an enclosed shape defined by the path definition is filled. Conversely, when a rasteriser configured to accept clockwise defined path definitions receives an anti-clockwise path definition, the area outside of the outline forming the enclosed shape is filled instead. For ease of explanation, the methods are described below by way of example, where a shape defined in clockwise direction is filled inside the enclosed area formed by an outline of the shape.

The scalable path definitions for a character within a font are also known as "glyphs". A glyph is typically defined by multiple shapes, which specify the outline of a corresponding character. Typically each path definition of a font defines a non-self-overlapping enclosed shape, whereby the non-self-overlapping shape features outline edges that do not cross other edges.

The described methods operate on font data that is defined using non-self-overlapping closed-shapes. However, where shapes that are not non-self-overlapping-closed-shapes are encountered, the shapes may be decomposed into multiple non-self-overlapping shapes. Self-overlapping shapes may be divided into multiple non-self-overlapping shapes, and non-closed shapes may be closed, but as fonts do not feature such shapes, then such a step may typically be skipped for improved performance.

Figure 18:
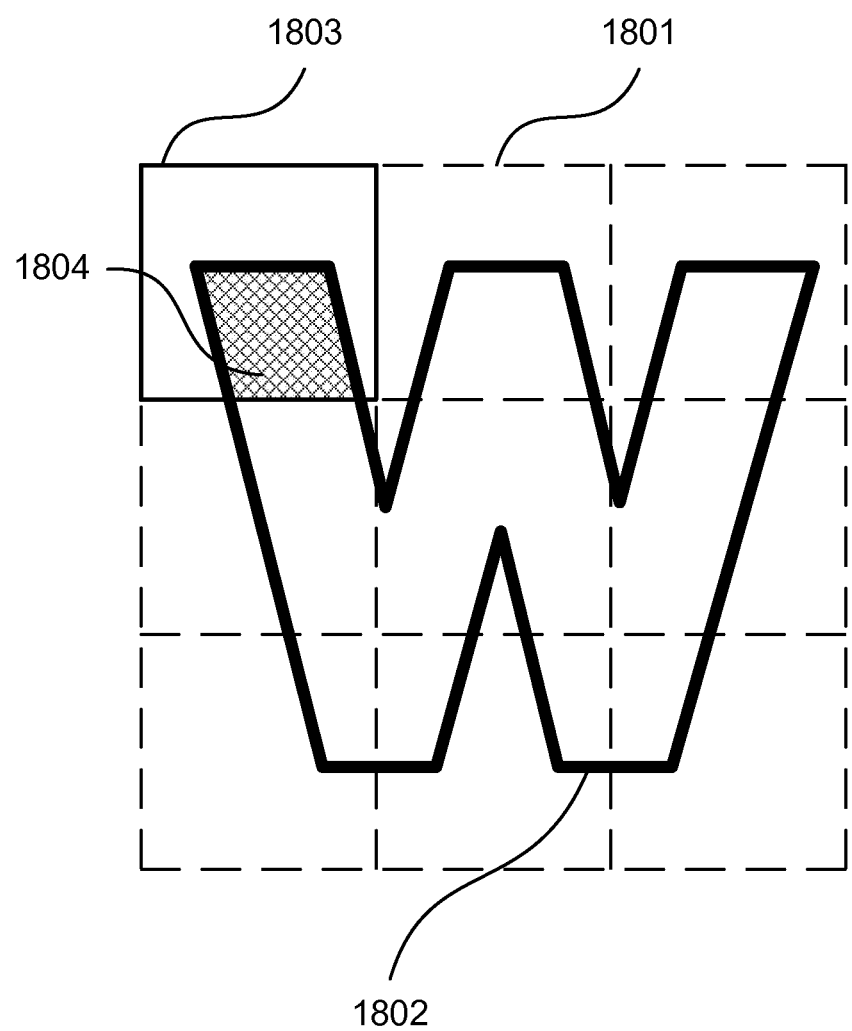
FIG. 18 is a diagram showing coverage area of a pixel.

With reference to FIG. 18, the coverage area of a pixel will now be explained. The coverage area of a pixel corresponds to the intersection area of a pixel and a scalable path definition for a character. In the example of FIG. 18, scalable path definition 1802 is to be rasterised into a pixel grid 1801. For each pixel where a pixel area overlaps with the scalable path definition, such as top-left pixel 1803 in FIG. 18, the coverage area of the pixel 1803 corresponds to the intersection of the area 1804 inside the outline of the shape defined by the scalable path definition, clipped to the pixel area.

Figure 1B:
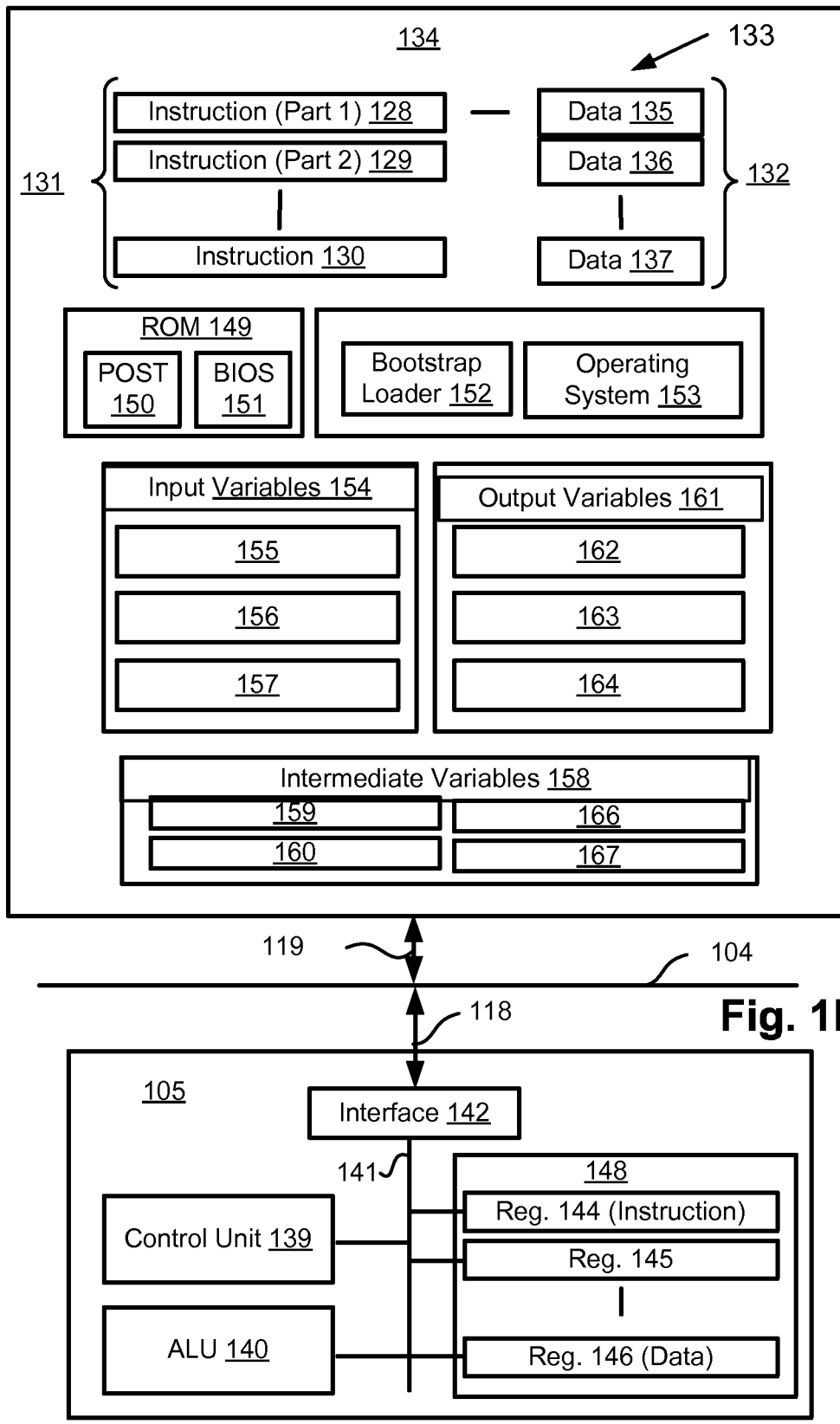

FIGS. 1A and 1B depict a general-purpose computer system 100, upon which the various arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

The described methods may be implemented using the computer system 100 wherein the processes of FIGS. 2 to 18, to be described, may be implemented as one or more software application programs 133 executable within the computer system 100. In particular, the steps of the described methods are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. ///A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically include a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 2 to 18 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 2:
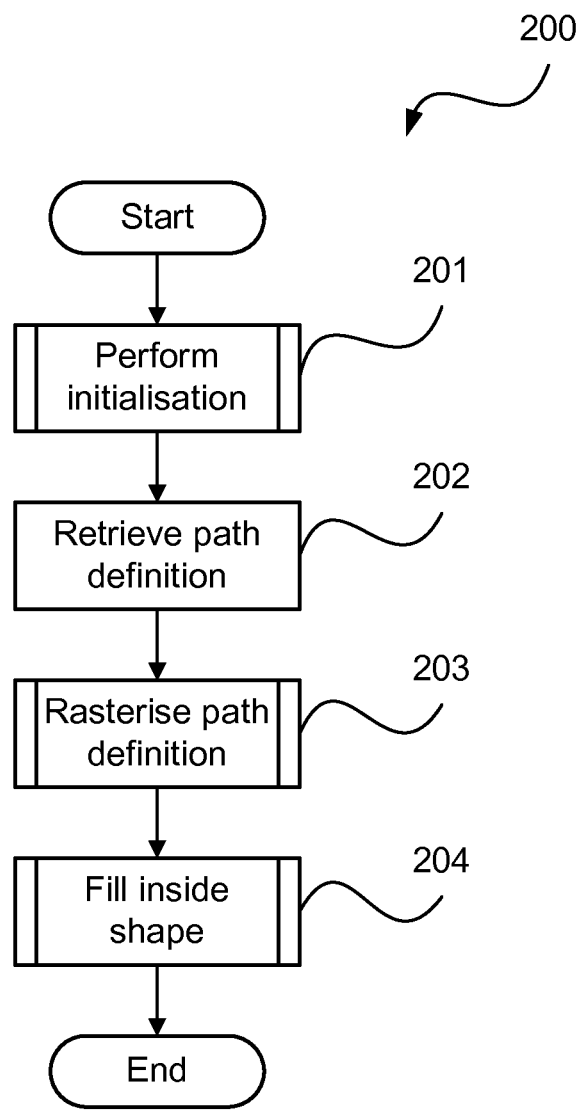
FIG. 2 is a schematic flow diagram showing a method of determining a raster representation for a path definition.

A method 200 of determining a raster representation for a path definition will now be described with reference to FIG. 2. The method 200 may be implemented as one or more code modules of the software application program 133 resident on the hard disk drive 110 and being controlled in its execution by the processor 105.

The method 200 begins at an initialisation step 201, where the processor 105 performs initialisation. A method 300 of performing initialisation, as executed at step 201, will be described in detail below with reference to FIG. 3.

Following step 201, the method 200 proceeds to retrieval step 202, where the processor 105 retrieves a path definition to be rasterised and stores the path definition in RAM 106. The path definition defines a character of a font to be displayed, for example, on the display 114. At step 202, the processor 105 queries a font file configured within RAM 106 and containing the path definition for the character. The path definition may be retrieved in response to a request for a character from a font file, and steps to reduce the path definition to a target display size may be performed before the path definition is rasterised.

At rasterising step 203, once the path definition is available in RAM 106, the processor 105 rasterises the path definition. A method 400 of rasterising a path definition, as executed at step 203, will be described in detail below with reference to FIG. 4.

Following step 203 the method 200 proceeds to filling step 204, where the inside of the outline of the shape defined by the path definition is filled under execution of the processor 105. A method 1000 of filling the inside of the outline of the shape defined by the path definition, as executed at step 204, will be described in detail below with reference to FIG. 10. Also at step 204, the processor 105 determines a final raster representation for the path definition and stores the raster representation in a pixel buffer configured within the RAM 106.

As described above, the method 200 performs rasterisation by rasterising the path definition at step 203 and then filling the pixels corresponding to the inside of the outline of the shape defined by the path definition at step 204. While the order of the steps of the method 200 is described as the rasterisation step 203 before the filling step 204, in alternative arrangements the filling step 204 may be executed before the rasterisation step 203.

Figure 3:
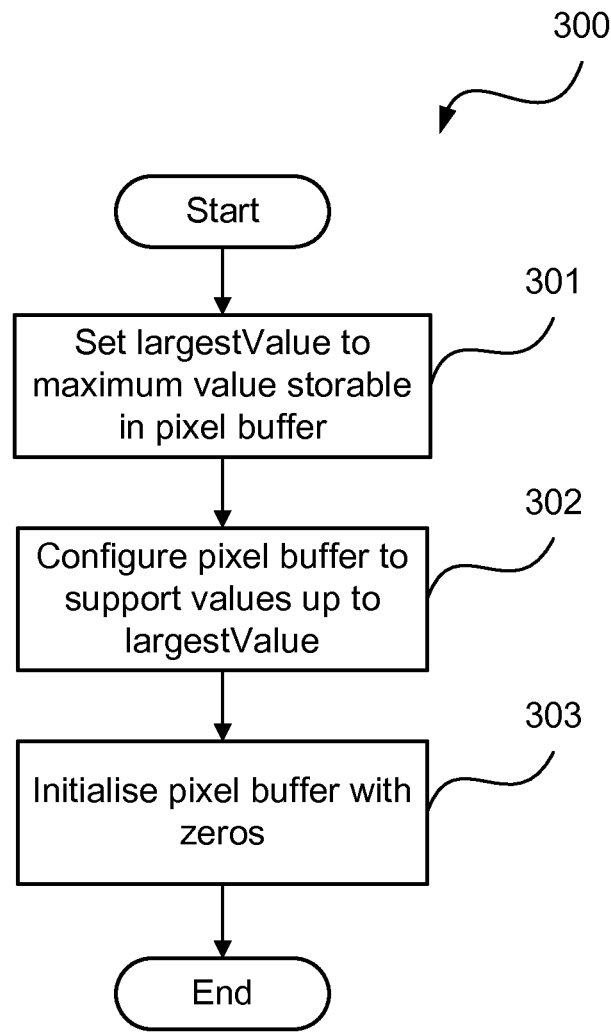
FIG. 3 is a schematic flow diagram showing a method of performing initialisation, as executed in the method of FIG. 2.

The method 300 of performing initialisation, as executed at step 201, will now be described in detail below with reference to FIG. 3. The method 300 may be implemented as one or more code modules of the software application program 133 resident on the hard disk drive 110 and being controlled in its execution by the processor 105. The method 300 may be used for configuring the pixel buffer for storing the coverage area to use a predetermined number of bits.

The method 300 begins at determining step 301, where the processor 105 determines a maximum value (or "maximum storable value") able to be stored in the pixel buffer to be used to store a raster representation as determined at step 204. The maximum storable value depends on required precision and data type utilised for the pixel buffer. The maximum storable value represents total area of a pixel able to be stored in the pixel buffer depending the required precision and data type. For example, the computing data type typically utilised for rasterisation buffers is "unsigned char". The unsigned char data type is specified in the C-programming language to be a data type capable of storing integer values in the range of zero (0) to two hundred and fifty five (255) inclusive and is representable using eight bits. With the "unsigned char" data type, the maximum storable value supported is two hundred and fifty five (255). The data type utilised for the pixel buffer configures the pixel buffer to use a predetermined number of bits for storing the coverage area of the pixel. Once the maximum value is determined, the determined value may be stored within RAM 106 as a "largestValue" variable. Alternatively, as described below, the maximum storable value may be predetermined. The maximum storable value will be referred to below as the largestValue.

After determining the maximum storable value at step 301, at configuration step 302 the processor 105 configures the pixel buffer to store a value based on the largestValue, such that each entry in the pixel buffer can store a data value corresponding to the data type from which the largestValue was derived. The configuration of the pixel buffer ensures that sufficient storage space is available for representing the raster representation determined at step 204. The pixel buffer may be configured to have a sufficient number of entries to store the raster representation corresponding to a product of width and height of the path definition to be rasterised.

Once the pixel buffer is configured at step 302, the method 300 proceeds to initialisation step 303 where the processor 105 initialises the pixel buffer with zeroes. The pixel buffer is initialised with zeroes in preparation for updating later, such as in steps 612, 609 and 1205 to be described below.

In another alternative arrangement, the determination of the largestValue (or maximum storable value) for the pixel buffer may be determined implicitly by choice of data type of the pixel buffer. In this instance, the largestValue may not need to be performed at the time of rasterisation (i.e., the largestValue may be predetermined).

With the configuration of the pixel buffer, a zero (0) value indicates that a pixel element corresponding to the buffer location is completely outside of the outline of an enclosed shape defined by the path definition, and a value corresponding to largestValue corresponds to a pixel completely inside the outline of the enclosed shape. Any value in between zero (0) and the value denoted by largestValue indicates that a pixel is intersecting the outline of the enclosed shape defined by the path definition.

Figure 4:
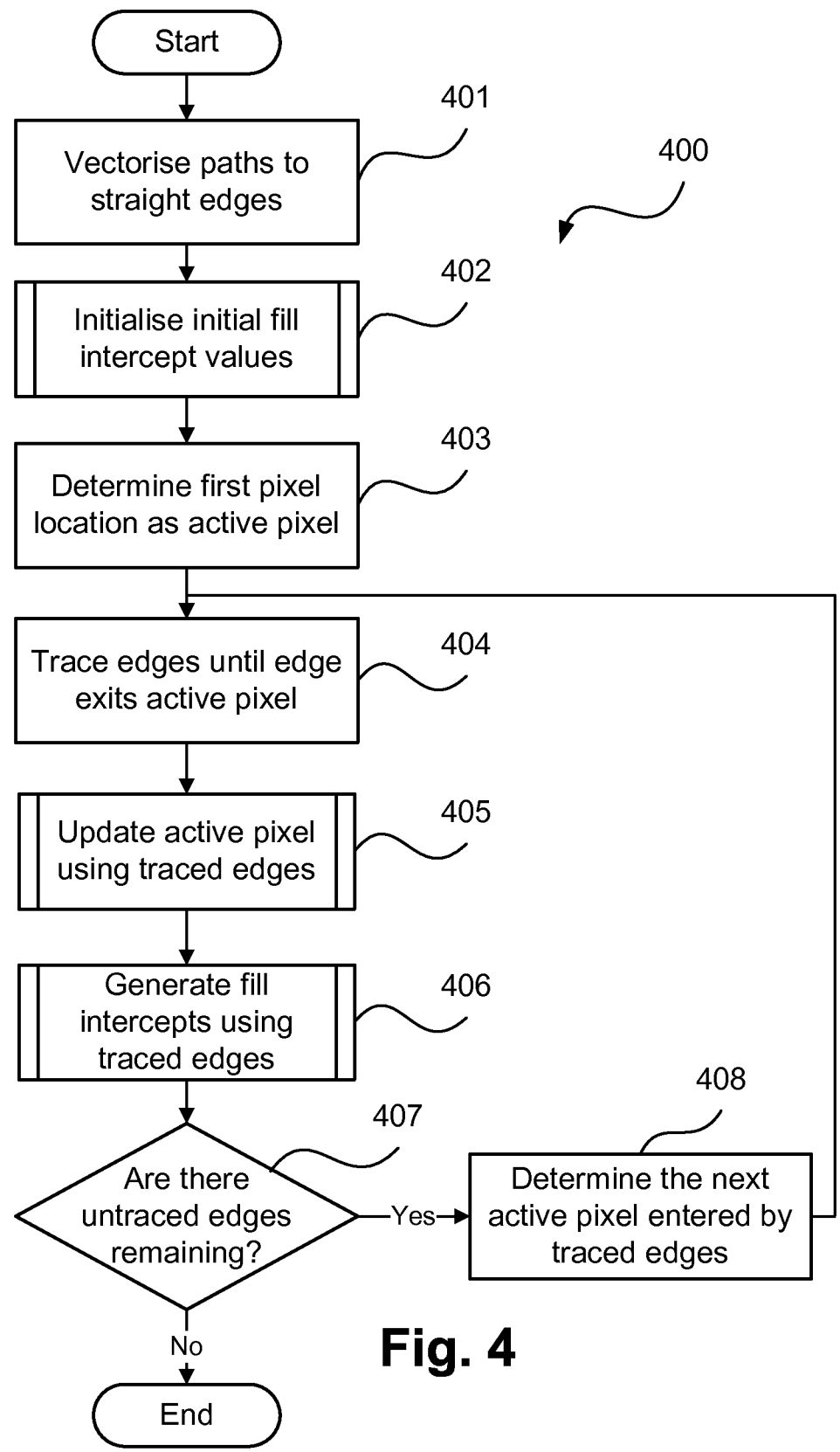
FIG. 4 is a schematic flow diagram showing a method of rasterising a path definition, as executed in the method of FIG. 2.

The method 400 of rasterising a path definition, as executed at step 203, will now be described in detail below with reference to FIG. 4. The method 400 may be implemented as one or more code modules of the software application program 133 resident on the hard disk drive 110 and being controlled in its execution by the processor 105.

As described above, the path definition, corresponding to the character to be displayed, is retrieved at step 202 and stored in RAM 106. The method 400 begins at vectorisation step, where the processor 105 converts the path definition into a set of straight line edges (i.e., vectorises the path definition) and stores the straight line edges in RAM 106. At step 401, curves are approximated by straight line edges providing an approximation of the outline of the shape defined by the path definition to be rasterised. The vectorisation step 401 simplifies the processing of the path definition, so that the path definition is defined using one type of construct. The vectorised edges are an ordered list of points, which imply straight line edges between the points, defined in the same order to the shape defined by the path definition. The ordered list of points for the vectorised edges may be stored in the RAM 106. The accuracy of the approximation depends on required level of accuracy and may be produced by recursive subdivision of a curve until an acceptable level is reached. The straight line edges corresponding to the outline of the shape may be used for performing rasterisation in accordance with the described methods.

Once the edges corresponding to the outline of the shape are produced, the method 400 proceeds to initialisation step 402, where initial fill intercept values are initialised and stored within RAM 106. A method 500 of initialising initial fill intercept values, as executed at step 402 will be described in detail below with reference to FIG. 5.

Following step 402, the method 400 then proceeds to active pixel step 403, where a first pixel location to use as an active pixel is determined under execution of the processor 105. The active pixel corresponds to the pixel that will be updated with the coverage area, and is represented by an entry in the pixel buffer configured within RAM 106. The first pixel location corresponds to the first pixel that is entered and exited by the vectorised edges determined at step 401.

At tracing step 404, the edges are traced until an edge exits the active pixel determined at step 403. An edge exits the active pixel when an edge intersects boundaries of the active pixel. The tracing step is performed by iterating through each control point in the ordered list of points determined at step 401 until a control point is detected which is in a pixel that is different to the current active pixel. When an edge leaving the active pixel is determined, the method proceeds to updating step 405.

Following step 404 the method 400 proceeds to step 405, where the processor 105 updates the pixel buffer, corresponding to the active pixel, using the traced edges determined at step 404. The active pixel is updated at step 405 by determining the contribution of the current traced edge to the raster representation of the active pixel. A method 600 of updating an active pixel using traced edges, as executed at step 405, will be described below with reference to FIG. 6

Once the active pixel is updated at step 405, at generating step 406, the software 133, generates fill intercepts using the traced edges 406. A method 800 of generating fill intercepts, as executed at step 406, will be described below with reference to FIG. 8.

Then at determination step 407, if the software 133 determines that there are untraced edges remaining, then the method 400 proceeds to determining step 408. Otherwise, the method 400 concludes.

At step 408, a next active pixel is determined by analysing the last edge of the current traced edges. As the traced edge leaves the active pixel, the traced edge enters a next pixel. The next pixel entered by the traced edge is determined to be the next active pixel. Following step 408 the method 400 returns to step 404, where steps 404 to 407 are repeated for the remaining edges.

Figure 5:
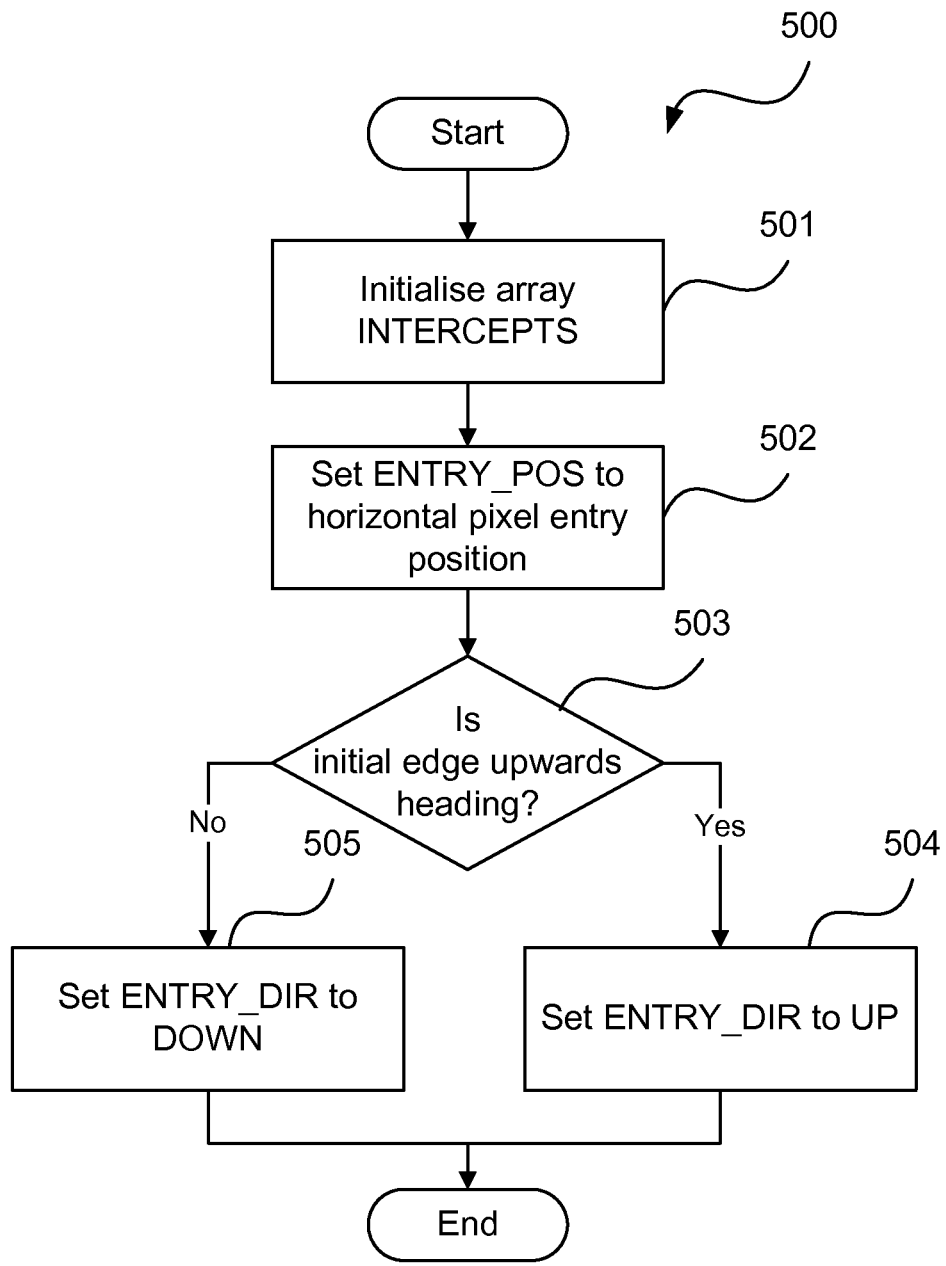
FIG. 5 is a schematic flow diagram showing a method of initialising the initial fill intercept values, as executed in the method of FIG. 4.

The method 500 of initialising initial fill intercept values, as executed at step 402, will now be described in detail with reference to FIG. 5. The method 500 may be implemented as one or more code modules of the software application program 133 resident on the hard disk drive 110 and being controlled in its execution by the processor 105.

The method 500 begins at initialisation step 501, where the processor 105 initialises an array, "INTERCEPTS", configured within RAM 106. The INTERCEPTS array is configured to have a sufficient number of entries for storing intercept values for each row in the raster representation to be determined at step 204. Each entry in the INTERCEPTS array is an ordered list used to store the intercept positions for each row. The intercepts correspond to instructions specifying positions within each row to start turning on and turning off pixels, and are thus used to perform monochromatic render. Each array entry may be implemented as an array or a list data structure. However, entries need to be able to store a value corresponding to a horizontal position in each row, and a flag to indicate ON or OFF and be sorted in the horizontal position value.

Once the INTERCEPTS array is initialised at step 501, the method 500 proceeds to step 502 where a variable "ENTRY_POS" configured within RAM 106 is initially set to a value corresponding to a first horizontal pixel entry position. The first horizontal pixel entry position may be retrieved from the traced edges and may be expressed as a value including fractional components. For example, if the traced edge crosses a pixel edge at position 5.2345, then the value stored at step 501 will include a full non-fractional integer component which corresponds to the $5^{th}$ pixel position, and a fraction value of 0.2345 within the $5^{th}$ pixel position.

Following step 502, the method 500 proceeds to determination step 503, if the processor 105 determines that the initial edge (i.e. first edge entering pixel) is upwards heading then the method 500 proceeds to step 504. Otherwise, the method 500 proceeds to step 505. An upwards heading edge enters the pixel on the bottom side of a pixel, whereas a downwards heading edge enters the top side of the pixel.

If the edge enters the pixel at the bottom, then at step 504, a variable "ENTRY_DIR" configured within RAM 106 is set to the value UP. If the initial edge is not upwards heading, then a variable "ENTRY_DIR" configured within RAM 106 is set to the value DOWN.

The values UP and DOWN are enumeration types and may be represented using string value. Alternatively, the values UP and DOWN may be represented by enumeration types if supported by the programming language used to implement the described methods. In one arrangement, the values UP and DOWN may be implemented using single bit values, where the values are assigned such that DOWN is represented by the value one (1) and UP is represented by the value zero (0).

The method 600 of updating an active pixel using traced edges, as executed at step 405, will now be described with reference to FIG. 6. The method 600 may be implemented as one or more code modules of the software application program 133 resident on the hard disk drive 110 and being controlled in its execution by the processor 105.

The method 600 begins at step 601, where the processor 105 is used for performing the step of determining a "fragment area" for the active pixel. In one arrangement, the fragment area determined at step 601 corresponds to an area of a polygon bounded by (i) a traced edge, the entry side of the active pixel (i.e., the side of the pixel entered by an edge intersecting the active pixel), the exit side of the active pixel (i.e., the side of the pixel exited by an edge intersecting the active pixel), and other sides of the active pixel between the entry and exit sides of the pixel in an anti-clockwise direction. Examples of fragment areas are described below with reference to FIG. 13.

In the described methods, a fragment area is determined for each of the edges intersecting the active pixel, each of the determined fragment areas representing an area of the active pixel located to a side of a corresponding edge, the side of the corresponding edge being selected according to a direction of the corresponding edge. The side of the corresponding edge is determined based on an edge direction received for each edge of the scalable path definition intersecting the pixel. Also at step 601, the processor 105 may perform the step of receiving an edge direction for each of the edges intersecting the active pixel. A method 700 of determining a fragment area, as executed in step 601, will be described in detail below with reference to FIG. 7.

Next the value in the pixel buffer corresponding to the current active pixel is read by the processor 105 at reading step 602. After reading the buffer value at step 602, one or more checks may be performed to determine capability of the system 100 at steps 603 and 604. While steps 603 and 604 are present in the flow diagram of FIG. 6, steps 603 and 604 are optional. Alternatively, steps 603 and 604 may be pre-determined before runtime and/or determined offline. Steps 603 and 604 are described here to show possibilities of various configurations of such a system.

At decision step 603, if the processor 105 determines that the pixel buffer utilises a data type that supports a wrapping property, then the method 600 proceeds to step 605. Otherwise, the method 600 proceeds to step 604.

At adding step 605, the value read at step 602 and the area determined at step 601 are added together (i.e., value+area) and stored into the pixel buffer corresponding to the active pixel, while allowing wrapping to occur. A data type is determined to support wrapping when a requested value being stored is larger than a supported range. In this instance, the most significant bits of the value are truncated and remaining lower bits are stored. In particular, the processor 105 may be used for storing the least significant bits corresponding to the area determined at step 601 in the buffer. In one arrangement, the number of bits stored corresponds to the predetermined number determined based on the largestValue as described above. For example, if the data type of the pixel buffer is "unsigned char", then the pixel buffer supports storing integer values of the range zero (0) to two hundred and fifty five (255) inclusive. If an attempt to store a value of three hundred and eighty two (382) inside a storage value of "unsigned char", then the resultant value actually stored is one hundred and twenty six (126), since the original value requires nine-bits to store when represented in binary form. The ninth bit is discarded. The value in the existing pixel buffer corresponds to zero (0) if no edges have touched the pixel, and is a non-zero value if an edge has entered the pixel corresponding to the pixel buffer and has coverage information.

As will be described in more detail below, the summation (or "sum") of a new fragment area with the existing fragment area value, corresponding to the existing fragment area, produces a resultant pixel coverage area corresponding to multiple edges intersecting the pixel. In the described methods, the coverage area of a scalable path definition covering a pixel (i.e., the coverage area) is determined based on a sum of the fragment areas. As described in more detail below, the described methods may be used where a sum of the fragment areas is greater than a total maximum area of the pixel.

Once the storage of the result determined at step 605 is complete, the method 600 concludes and flow proceeds to step 406 of the method 400.

In one arrangement, if the processor 105 determines at step 603 that wrapping is not supported, then the method 600 proceeds to determination step 604. At step 604, if the processor 105 determines that the sum "largestValue+1" produces a value that is a power of two (2) (i.e., is largestValue+1 a power of 2) then the method 600 proceeds to setting step 606. Otherwise, the method 600 proceeds to setting step 610.

At step 606, the processor 105 is used for determining a mask value that is equal to the largestValue. In particular, the processor 105 sets a mask value variable "maskValue" to the value of the largestValue attribute (i.e., set maskValue=largestValue).

Following step 606, the method 600 proceeds to summation step 607, where the processor 105 determines a summation of the value read at step 602 and the area determined at step 601 and stores the summation in RAM 106 (i.e., set result to "value+area").

Then at following masking step 608, the processor 105 is used for applying a bitwise mask operation, using the mask value, to the summation determined in step 607. In particular, the value of the maskValue variable is used to perform the bitwise mask operation on the summation determined in step 607 (i.e., apply bit-wise AND operation to result using maskValue). The bitwise mask operation executed at step 608 simulates the wrapping operation that was performed at step 605. However, rather than executing step 605, steps 606, 607 and 608 may be used on platforms not supporting wrapping, or where wrapping causes a system exception which prevents the system 100 from proceeding. Once a result of the bitwise mask operation has been calculated at step 607, the result is stored into the pixel buffer at following storing step 609.

In one arrangement, if the determination of sum of "largestValue+1" is determined at step 604 to produce a value that is not a power of two, then the method 600 proceeds to determination step 610. At step 610, if the processor 105 determines that the result of the summation of the value read at step 602 and the fragment area determined at step 601 is greater than the value of the largestValue variable (i.e., is value+area>largestValue), then the method 600 proceeds to setting step 611. Otherwise, the method 600 proceeds to step 612.

At step 611, the processor 105 adds the value read at step 602 and the area determined at step 601 and subtracts "largestValue−1" (i.e., value+area−largestValue−1). As described above, the largestValue (or maximum storable value) represents total area of a pixel able to be stored in the pixel buffer depending the required precision and data type. As such, by subtracting the largestValue at step 611, the processor 105 is subtracting a value corresponding to a total area of the active pixel from the sum of the fragment area and the value read at step 602. The result of step 611 is then stored into the pixel buffer configured within the RAM 106 at storing step 609.

At storing step 612, the summation of the value read at step 602 and the area determined at step 601 (i.e., "value+area") are stored into the pixel buffer configured within the RAM 106.

Figure 6:
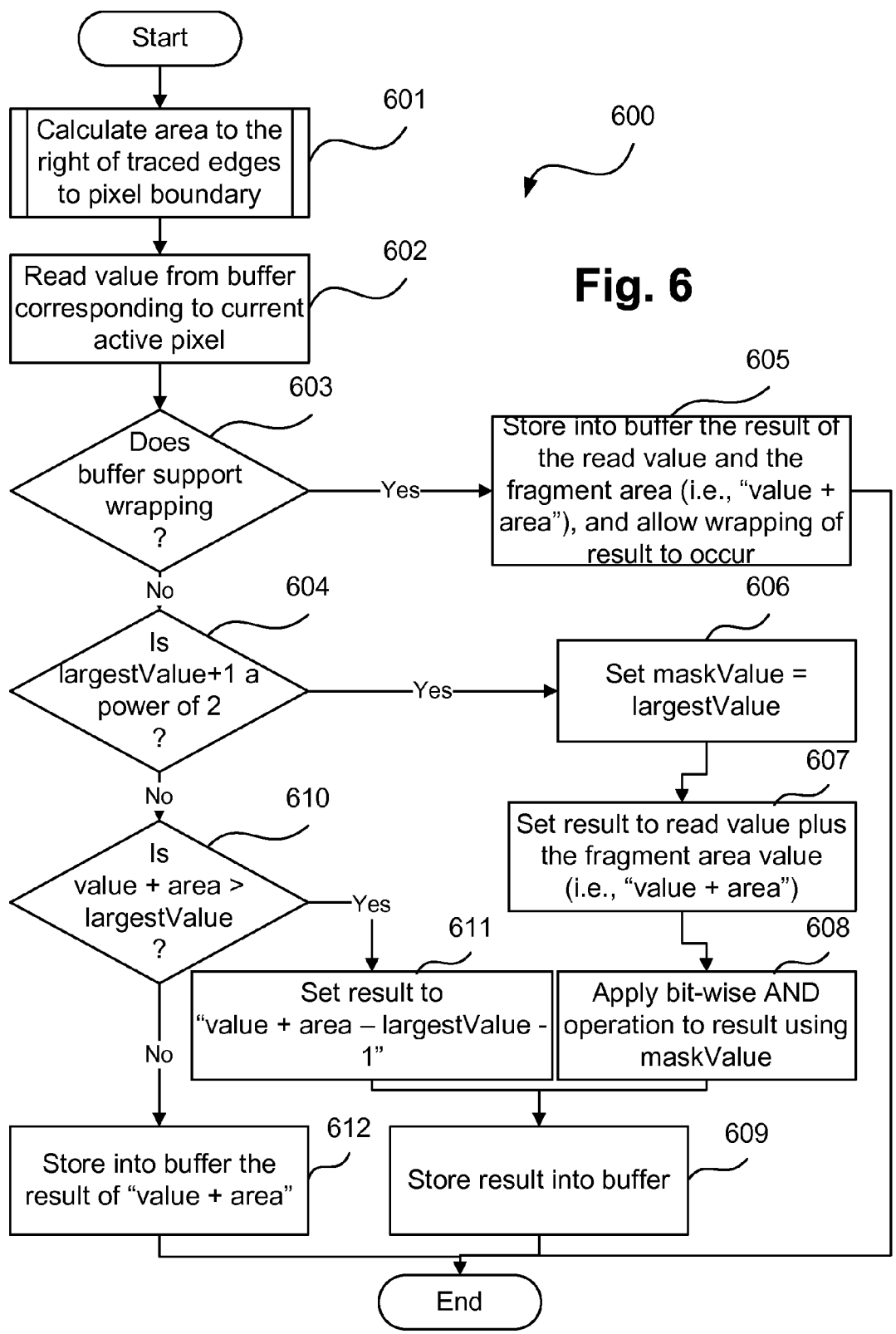
FIG. 6 is a schematic flow diagram showing a method of updating an active pixel using traced edges, as executed in the method of FIG. 4.

FIG. 6 shows one arrangement of the method 600. In another arrangement, only steps 601, 602 and 605 may be performed. In still another arrangement, only steps 601, 602, 604, 606, 607, 608 and 609 are executed, without steps 603 and 605. In still another arrangement, only steps 601, 602, 610, 611, 612 and step 609 are executed, without steps 603, 605, 604, 606, 607 and 608.

Figure 7:
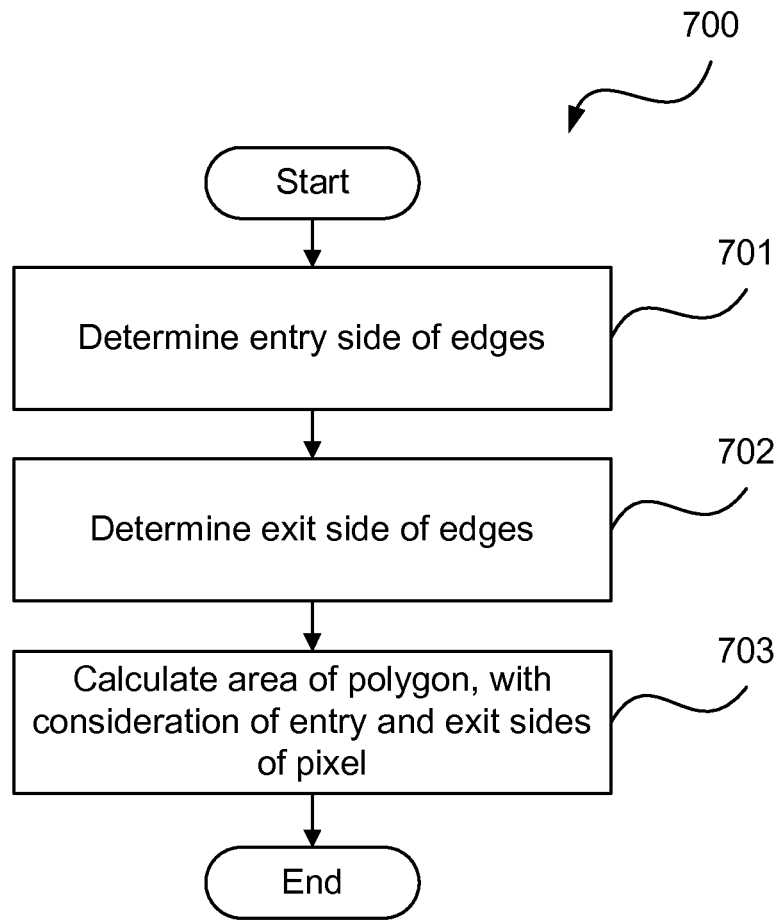
FIG. 7 is a schematic flow diagram showing a method of determining a fragment area, as executed in the method of FIG. 6.
Figure 17A:
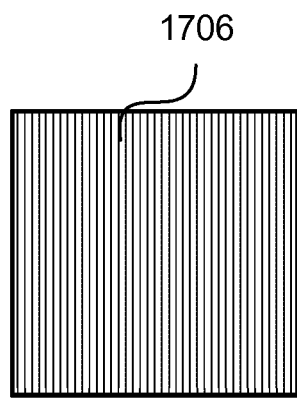
FIG. 17A is a diagram showing an example of a pixel having a total maximum area.
Figure 17B:
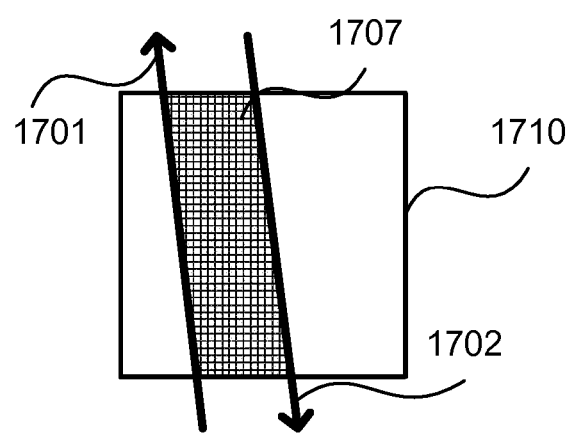
FIG. 17B shows the pixel of FIG. 17A intersected by two edges.

When the active pixel is updated by combining the existing value of the active pixel with the newly calculated fragment area, the coverage area for a pixel (i.e., the area of a pixel covered by a scalable path definition for a character) may be determined. In one arrangement, the "right" side refers to the right-side of a traced edge, while considering the edge direction of the traced edge. With reference to FIG. 7, edge direction will be described in more detail below. In one example, FIG. 17A shows a pixel 1710 having a maximum total area 1706 defined by a boundary of the pixel 1710. As shown in FIG. 17B, in the example, the pixel 1710 is intersected by two edges 1701 and 1702. One edge 1701 enters the pixel 1710 from the bottom side and leaves the pixel on the top side. The second edge 1702, which is configured to the right of the first edge 1701, enters the pixel from the top side of the pixel 1710 and leaves the pixel 1710 on the bottom side.

Figure 17C:
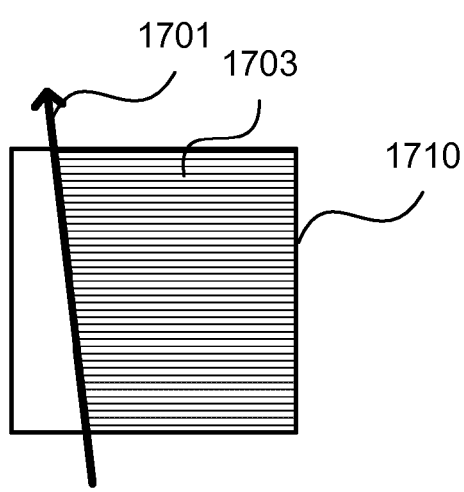
FIG. 17C shows a fragment area situated between a first edge and the right side of the pixel of FIG. 17A.
Figure 17D:
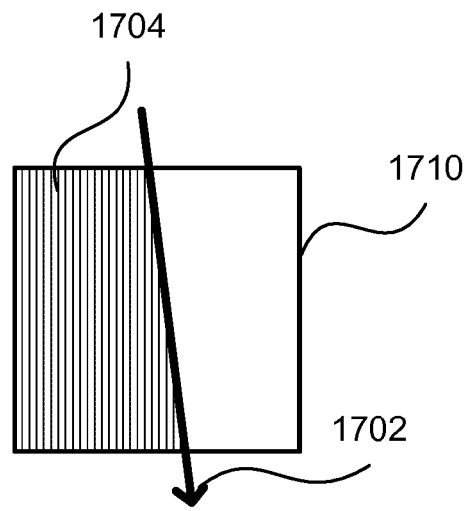
FIG. 17D is a diagram showing a fragment area situated between a second edge and a side of the pixel to the right of the second edge.

An area value calculated for the first edge 1701 is fragment area 1703, as shown in FIG. 17C, which is an area situated between the edge 1701 and the right side of the pixel 1710. Similarly, the area calculated during the calculation for the second edge 1702 is fragment area 1704, as seen in FIG. 17D, which is the area between the second edge 1702 and the side of the pixel to the right of the edge 1702 (i.e., as defined by the edge direction of the edge 1702). A summation (or "sum") of the fragment areas 1703 and 1704 has a value greater than the total maximum area 1706 of the pixel 1710.

FIG. 17B shows an area 1707 between the first edge 1701 and the second edge 1702 to be calculated. The first fragment area 1703 corresponds to the calculated area for the first edge 1701. The second fragment area 1704 corresponds to the calculated area for the second edge 1702.

Figure 17E:
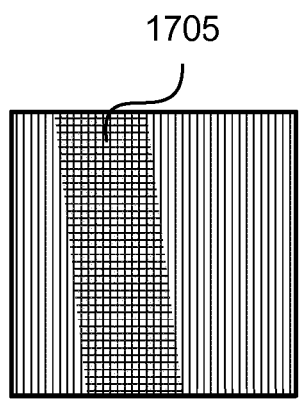
FIG. 17E shows an example of the fragment area of FIG. 17C combined with the fragment area of FIG. 17D to determine a coverage area for the pixel of FIG. 17B.
Figure 17E:
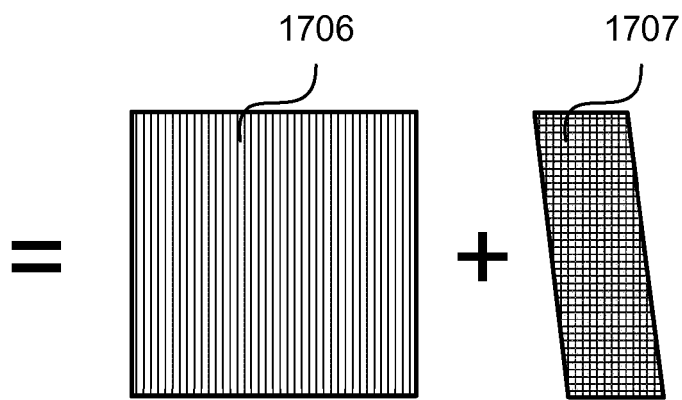

FIG. 17E illustrates why the described methods of combining fragment areas produce a correct area coverage value for the active pixel. As seen in FIG. 17E, when the two fragment areas 1703 and 1704 are combined, the area of the fragment areas 1703 and 1704 overlap in overlap area 1705. The overlap area 1705 is the same shape and size as the area 1707 between the initial edge 1701 and the edge 1702. Resultant area 1707 is equivalent to the summation of the maximum total area of the pixel 1706 with an area equivalent to the overlapping area 1705.

Using the property that the summation of two fragment areas produces a value that is larger than total area of the pixel (corresponding to largestValue) allows for each fragment area corresponding to each pixel to be calculated independently. The fragment areas may be processed in any order and multiple fragment areas for a pixel may be combined to produce the coverage area for a pixel.

When overlapping fragment areas are combined, if the resultant sum of the fragment areas is greater than the maximum pixel area value (i.e. largestValue), then a correct area can be derived by subtracting the maximum area of the pixel. Determination of the area may be performed efficiently, and other arrangements for determining the correct area will be described in more detail below.

In one arrangement, instead of performing a subtraction step, a data type used to store the coverage area of a pixel may be configured to be a range limited type with the property that a value wraps around when overflow occurs. When a range limited data type is used to store a value that is outside of the specified range, then the value is modified before the value is stored. For example, consider a range limited data type that stores integer values between zero (0) and ten (10) inclusive. If a value such as five (5) is stored in such a type, then the value is stored as five (5) unmodified. If a value such as eleven (11) is stored, then the value is modified to fit within the range zero (0) to ten (10). Often, the method of modifying values is by using a largest support value. So for the example of eleven (11), a value of zero (0) may be used. Similarly, a value of fifteen (15) may be used to store four (4) and so on.

In one arrangement, the data type may be configured to support values between zero (0) and largestValue inclusive. In another arrangement, if the largestValue is one less than a power of two, then the largestValue may be used as a bit mask. When combining the two areas 1703 and 1704, resultant area 1707 may be produced by adding the two fragment area values 1703 and 1704 together, and then selecting lower bits of the result by masking with the largestValue. Selecting lower bits of the result by masking in such a manner produces the same result (e.g., area 1707) as the overflow method for systems that do not support overflow and without using a branching statement which has performance benefits.

In another arrangement, the sum of the two areas 1703 and 1704 may be tested and the subtraction step of the maximum pixel area value (i.e. largestValue) may be performed to determine the final result area 1707.

The method 700 of determining a fragment area, as executed in step 601, will be described in detail below with reference to FIG. 7. The method 700 may be implemented as one or more software code modules of the software application program 133 resident on the hard disk drive 110 and being controlled in its execution by the processor 105.

The method 700 may be used for determining coverage area of the active pixel covered by the scalable path definition retrieved at step 202 of the method 200. As described above, the fragment area is the area to the right of the traced edges of the scalable path definition for the character. In one arrangement, using the traced edges, the edge direction may be used to determine the fragment area. The edge direction corresponds to the entry and exit position of an edge with the intersected pixel. The edge direction is calculated from the position that an edge intersects pixel boundaries on entry, and the intersection position of the edge with the pixel boundary on exit. In one arrangement, the processor 105 may be used for receiving an edge direction for each of the scalable path definition intersecting the active pixel prior to execution of the method 700.

The method 700 begins at determining step 701, where the entry side of the edges are determined under execution of the processor 105, by examining which boundary of the pixel the edge first intersects.

Next, the method 700 proceeds to determining step 702, where the exit side of the edges are determined, by tracing the edge until the pixel edge is intersected again. A calculation of the "area to the right of the traced edges" is performed and the entry and exit sides will assist in determining the area to be calculated.

Using the entry/exit information and the traced edges definition, a fragment area value is determined at following step determining 703, under execution of the processor 105. The fragment area determined at step 703 should have a range between zero (0) and largestValue inclusive, where largestValue corresponds to the maximum area possible, and zero (0) corresponding to no area coverage. Once the fragment area value is calculated, the method 700 is complete. As described above, a fragment area is determined for each of the edges intersecting the active pixel. Each of the determined fragment areas represents an area of the active pixel located to a side of a corresponding edge. The side of the corresponding edge is selected according to a direction of the corresponding edge.

Figure 13:
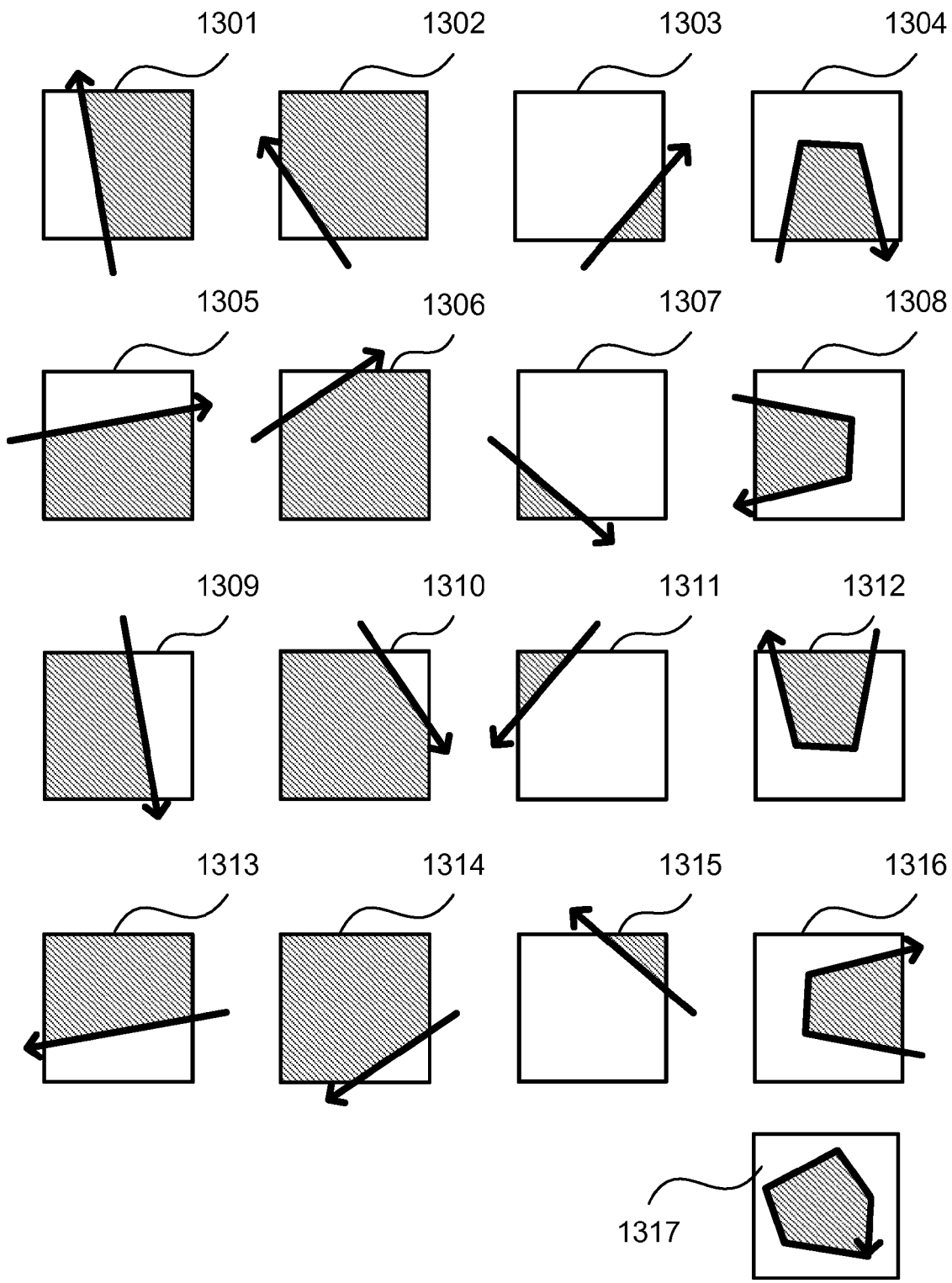
FIG. 13 is a diagram showing fragment areas for different edges entering and leaving pixel boundaries.

The area to the right side of the traced edges is defined to be the area to right side of the edge with consideration of the direction of the traced edges. FIG. 13 shows seventeen pixels 1301 to 1317. Each of the pixels has a corresponding edge (represented as an arrow) as shown in FIG. 13. As shown in FIG. 13, the side of the edges to calculate the fragment area (i.e., represented as shaded in each of pixels) depends on the direction of the associated edge. In FIG. 13, edges are entering pixels 1301 to 1304 from the bottom side and an associated fragment area corresponds to the area to the right of the edge entry position. Also in FIG. 13, edges are entering pixels 1305 to 1308 from the left and an associated fragment area corresponds to the area below the edge entry position. In FIG. 13, edges are entering pixels 1309 to 1312 from the top side and an associated fragment area corresponds to the area to the left of the entry position. In FIG. 13, edges enter pixels 1313 to 1316 from the right and an associated fragment area corresponds to the area above the edge entry position. Finally, if the traced edges do not enter or exit a pixel, such as with pixel 1317, an associated fragment area corresponds to the inside of the enclosed shape for clockwise defined shapes.

Figure 14:
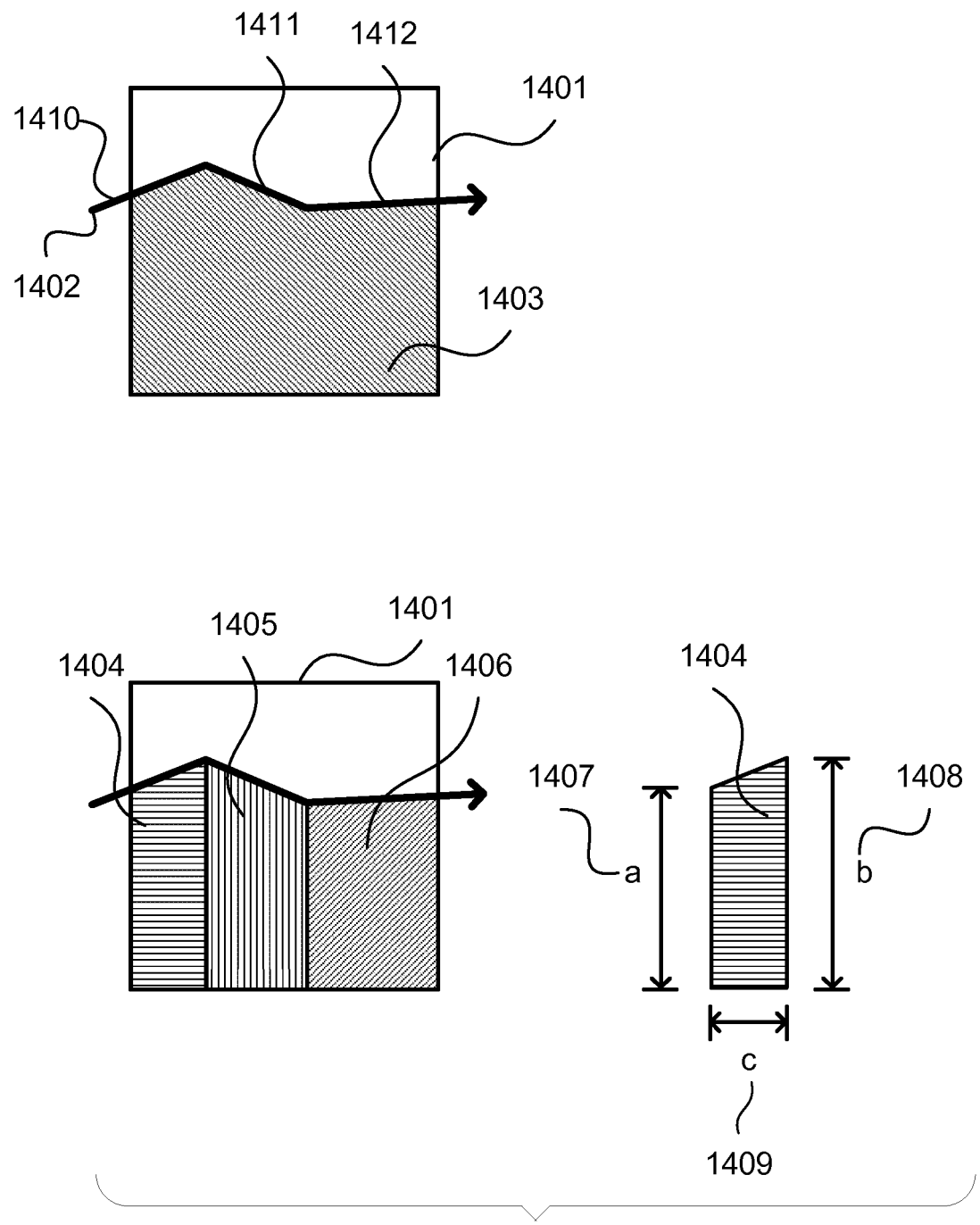
FIG. 14 is a diagram showing an example area bounded by a traced edge and a trapezoidal sub-area used to calculate areas.

The determination of the area on the right side of a traced edge may be performed by splitting the area into trapezoid shapes. For example, FIG. 14 shows a pixel (and associated boundary) 1401 with a traced edge 1402 composed of three edges 1410, 1411 and 1412. The traced edge 1402 enters the pixel 1401 on the left side and exits the pixel 1401 on the right side. In the example of FIG. 14, an associated fragment area 1403 corresponds to the region below the edges. As the traced edge 1402 intersecting the pixel 1401 is composed of three edges, three trapezoid areas 1404, 1405 and 1406 may be derived, which when combined together, form a region of the same area to that of the required area 1403. For each trapezium, using trapezoid area 1404 as an example, the area 1404 is calculated by determining two heights of the trapezium, "a" 1407 and "b" 1408, and width of the trapezium "c" 1409. The area of the trapezium 1404 is calculated by evaluating expression (a+b)*c/2.

Depending on the side of the pixel (e.g., 1401) the edges (e.g., 1410, 1411, 1412) enter, determination of parameters for calculating the area of the trapezium changes. For example, if the region corresponds to the area 1403 below the traced edges 1410, 1411 and 1412, then a height parameter is derived from vertical co-ordinates of control points of the edges, and width is derived from horizontal co-ordinates of the edge control points. For edges entering from the bottom side and exiting the top side of a pixel, heights derived from the vertical and width derived from the horizontals co-ordinates result, respectively.

Figure 15A:
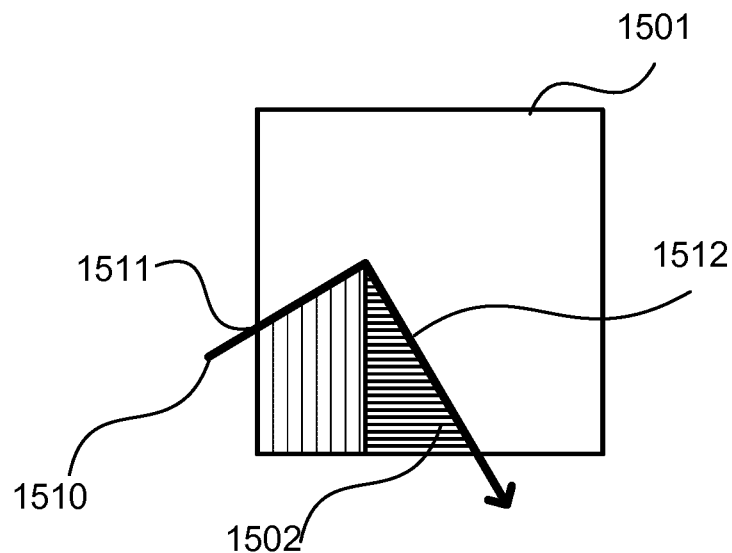
FIG. 15A is a diagram showing an example area calculation for a pixel where a traced edge leaves the pixel on an adjacent pixel side.

FIG. 15A shows an example of a traced edge 1510 comprising edges 1511 and 1512. The traced edge 1510 enters a pixel 1501 on the left side and exits on the bottom side of the pixel 1501. The edge 1512 which exits the pixel 1501 forms a final fragment area 1502 of the shape of a triangle. In the example of FIG. 15A, the area 1502 may be calculated as a trapezium with one of the heights being zero (0).

Figure 15B:
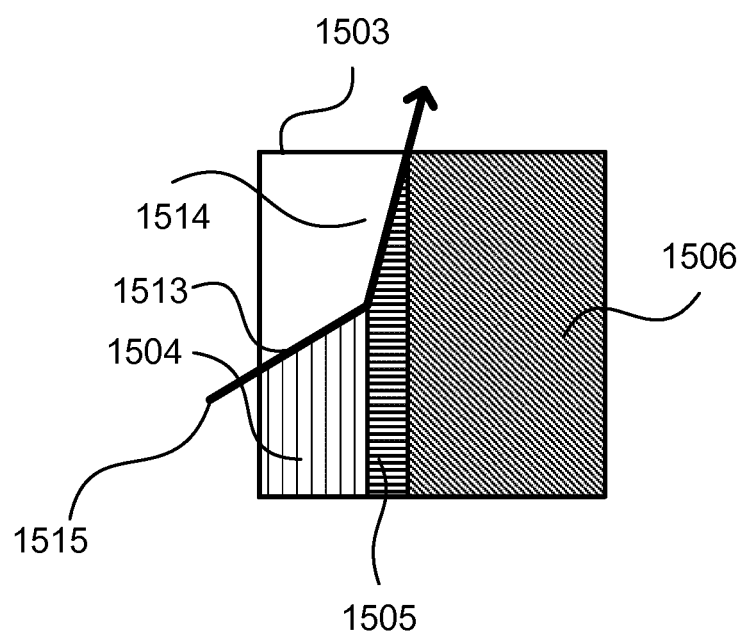
FIG. 15B is a diagram showing another example area calculation for a pixel where a traced edge leaves the pixel on an adjacent pixel side.

In another example, shown in FIG. 15B, a traced edge 1515 comprising edges 1513 and 1514 enters a pixel 1503 on the left side and exits on the top side of the pixel 1503. In the example of FIG. 15B, the edges 1513 and 1514 form two trapezoid areas 1504 and 1505, respectively. The fragment area for the pixel 1503 includes an additional rectangular area 1506 to complete the calculation of the fragment area. Similar to the triangle example of FIG. 15A, the trapezoidal area calculation method may be used to with equal height values to correctly calculate the area of the rectangular area 1506.

As the traced edges (e.g., 1510, 1515) are produced by vectorisation of curves to produce straight edges, the fragment area under each curve (i.e., under each traced edge 1510, 1515) may be determined by summation of the trapeziums (e.g., 1505). A fragment area may be derived by summation of the fragment area values using the trapezoidal area calculation method described above.

Figure 8:
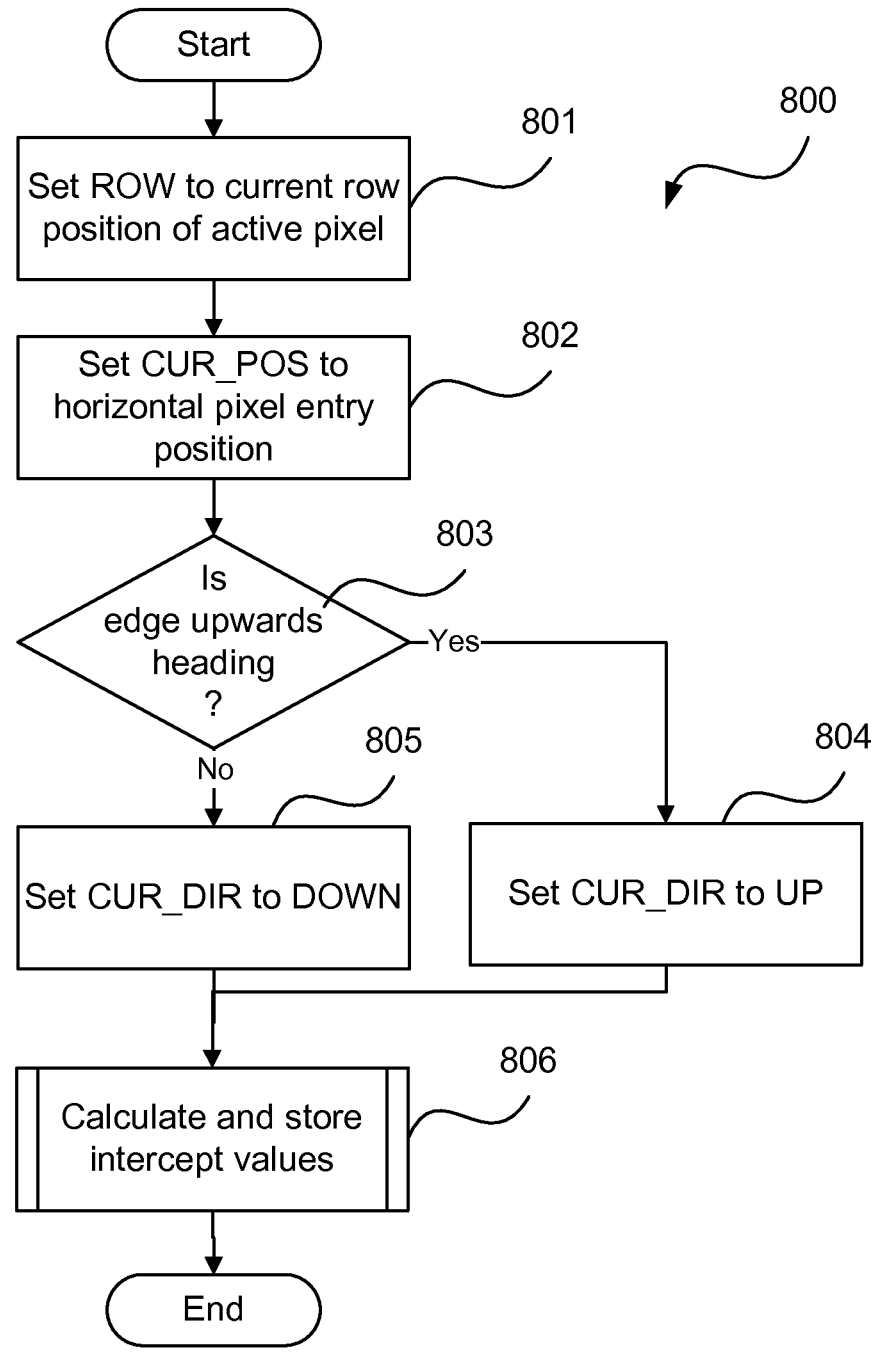
FIG. 8 is a schematic flow diagram showing a method of generating fill intercepts using traced edges, as executed in the method of FIG. 4.
Figure 9:
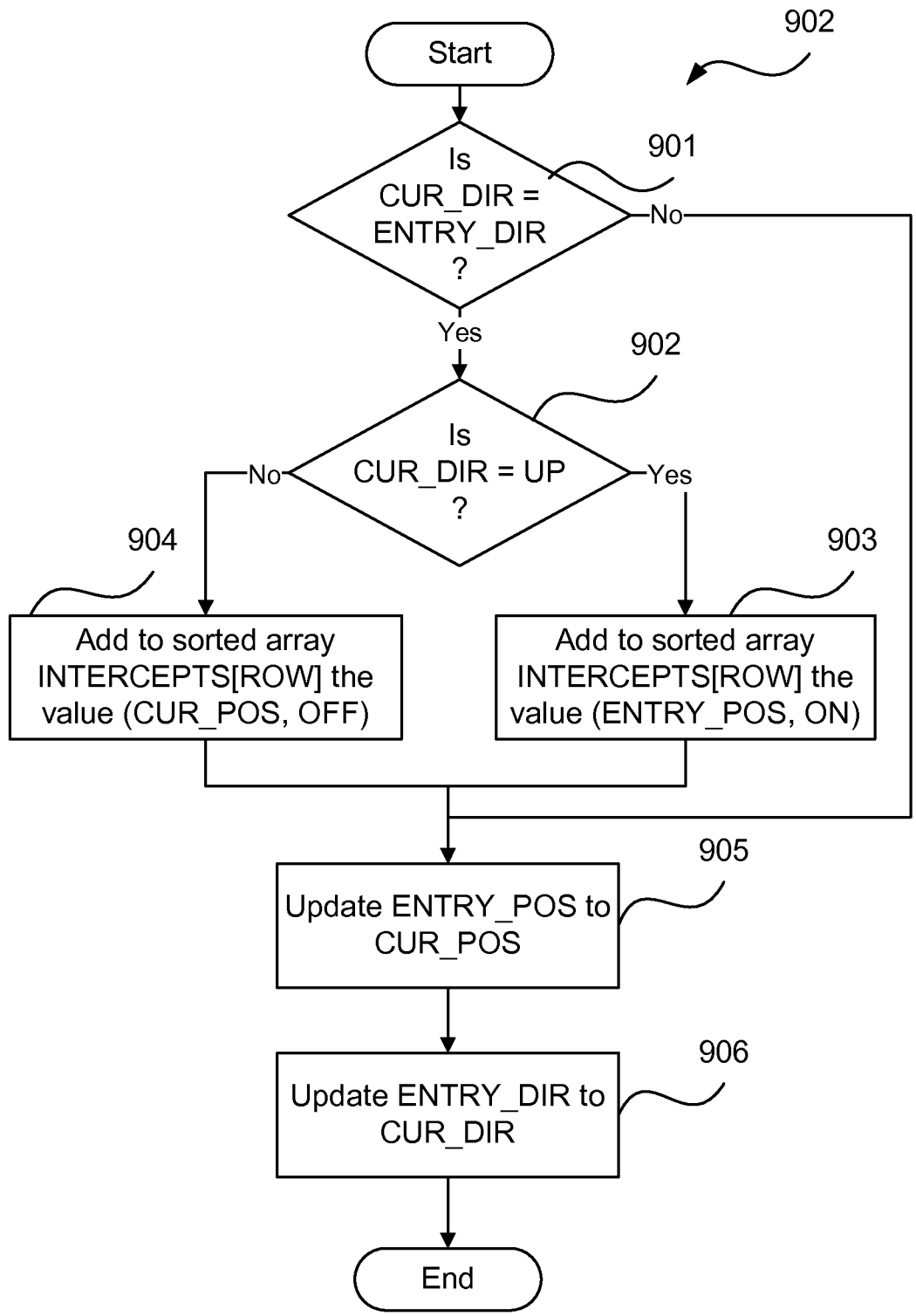
FIG. 9 is a schematic flow diagram showing a method of calculating and storing of intercept values, as executed in the method of FIG. 8.

The method 800 of generating fill intercepts using the traced edges, as executed at step 406, will be described below with reference to FIG. 8. The method 800 generates approximate fill intercept positions that are utilised by a fill step that yields a resulting fill intercept. The method 800 may be implemented as one or more code modules of the software application program 133 resident on the hard disk drive 110 and being controlled in its execution by the processor 105.

The method 800 begins at setting step 801, where a ROW variable configured within RAM 106 is set by the processor 105 to correspond to a current row position of the active pixel. The ROW variable may be used to identify intercepts corresponding to a row of the raster representation be determined at step 204. The intercepts are column positions within each row which indicate whether to start to turn the active pixel on or off, when using a scanline based rasteriser.

Following step 801 the method 800 proceeds to setting step 802 where a CUR_POS variable configured within RAM 106 is set to store a horizontal entry position of the active pixel. The horizontal entry position is expressed as a value including fractional components, similar to that of the ENTRY_POS variable.

Next, at determining step 803, a determination is made on whether the edge is upwards heading. If the edge is upwards heading then a CUR_DIR variable configured within RAM 106 is set to UP at setting step 804. Otherwise, the CUR_DIR variable is set to DOWN at setting step 805.

Once the CUR_DIR variable is set at either of steps 804 or 805, the method 800 proceeds to calculating step 806 where the processor 105 is used for calculating and storing intercept values. The intercept values may be stored in RAM 106 by the processor 105 following step 806. A method 900 of calculating and storing intercept values, as executed at step 806, will be described in more detail below with reference to FIG. 9. Once the step 806 of storing intercept values is complete, the method 800 is complete, and the flow continues back to step 407.

The method 900 may be implemented as one or more code modules of the software application program 133 being resident on the hard disk drive 110 and being controlled in its execution by the processor 105.

The method 900 begins at a comparison step 901, where the processor 105 is used for comparing whether the value of in the CUR_DIR variable is equal to the value in the ENTRY_DIR variable. If the values are equal, then the method 900 continues to the next determination step 902. Otherwise, the method 900 proceeds to step 905.

If the processor 105 determines that the CUR_DIR variable is equal to UP (i.e., is CUR_DIR=ENTRY_DIR), then the edge is heading upwards and the method 900 proceeds to storing step 903. Otherwise, the method 900 proceeds to storing step 904.

At step 903, the ENTRY_POS value and an ON flag is stored into the INTERCEPTS array at INTERCEPTS

[ROW] configured within RAM 106 (i.e., add to the sorted array INTERCEPTS[ROW] the value (ENTRY_POS, ON)). The INTERCEPTS[ROW] stores the intercepts corresponding to the specified row which is a sorted data structure. In one arrangement, the ENTRY_POS and ON flag may be stored within the same value, whereby the least significant bit is set to zero (0) to represent ON, and remaining upper bits are used to store the ENTRY_POS value.

As described above, if at determination step 902, the processor 105 determines that the edge is not UP, then the method 900 proceeds to storing step 904. At storing step 904, the value of the CUR_POS variable and an OFF flag is stored by the processor 105 in the array at INTERCEPTS [ROW] (i.e., add to sorted array INTERCEPTS[ROW] the value (CUR_POS, OFF)). In one arrangement, the ENTRY_ POS and OFF flag may be stored within the same value, whereby the least significant bit is set to one (1) to represent OFF, and the remaining upper bits is used to store the ENTRY_POS value.

Once the steps 903 and 904 completes, the method 900 proceeds to updating step 905. At updating step 905, the ENTRY_POS variable configured within RAM 106 is updated to store the value of the CUR_POS value (i.e., update ENTRY_POS to CUR_POS). Following step 905, the method 900 proceeds to updating step 906.

At step 906, the ENTRY_DIR variable is updated to store the value of the CUR_DIR variable (i.e., update ENTRY_ DIR to CUR_DIR) which will be used during the calculation of the next intercept values for the adjacent row.

If at determination step 901, the processor 105 determines that the CUR_DIR variable and the ENTRY_DIR variable do not have the same value, then the method 900 proceeds to step 905 where the value of the ENTRY_POS value is updated as described above.

Figure 10:
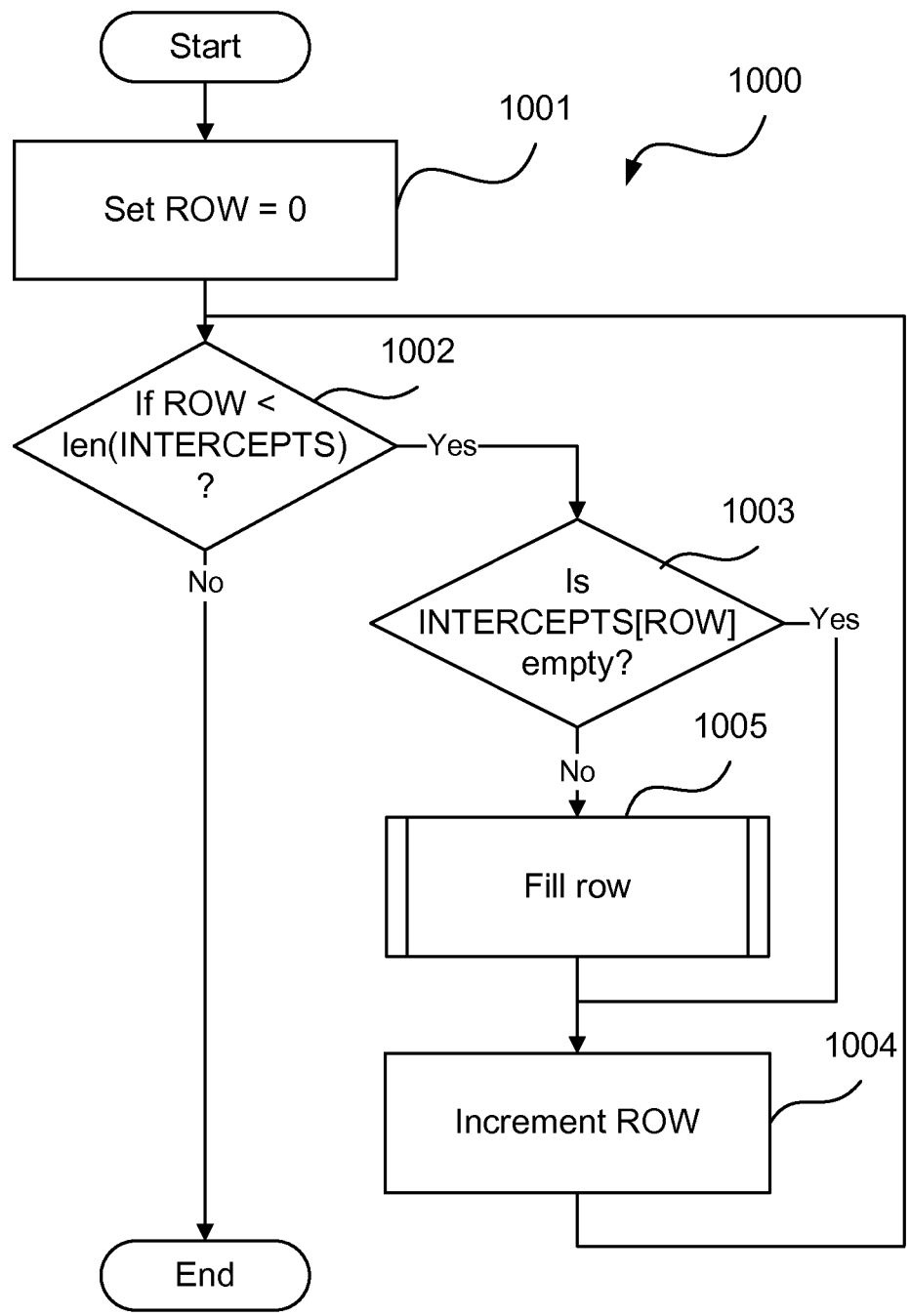
FIG. 10 is a schematic flow diagram showing a method of filling inside the outline of a shape defined by a path definition, as executed in the method of FIG. 2.
Figure 11:
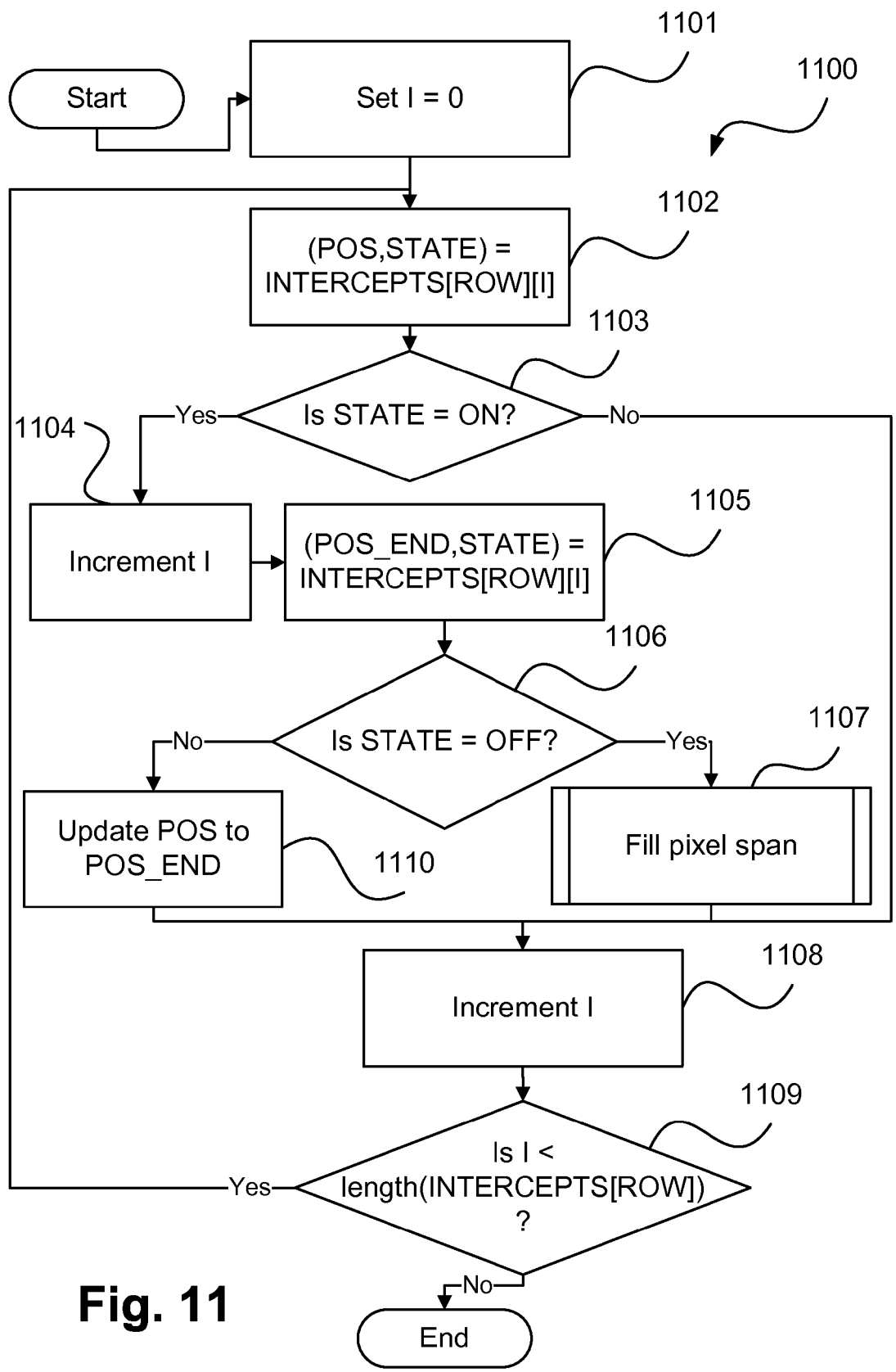
FIG. 11 is a schematic flow diagram showing a method of filling pixels inside the outline of a shape.

The method 1000 of filling the inside of the outline of the shape defined by the path definition, as executed at step 204, will be described with reference to FIG. 10. The method 1000 may be implemented as one or more code modules of the software application program 133 resident on the hard disk drive 110 and being controlled in its execution by the processor 105.

During the rasterisation of the path definition at step 203, the fill intercepts are generated as at step 406. The method 1000 begins at initialisation step 1001, where the ROW variable configured within RAM 106 is initialised to zero (0) (i.e., set ROW=0), which will be used to reference each row of intercepts.

Then at determination step 1002, the processor 105 determines if the ROW variable refers to a valid entry in the INTERCEPTS array (i.e., ROW<len(INTERCEPTS)), by checking if the value of the ROW variable is less than the length of the INTERCEPTS array. If the ROW variable refers to an entry not in the INTERCEPTS array, then the method 1000 concludes. Otherwise, if at determination step 1002 the processor 105 determines that the ROW variable refers to a valid entry, then the method 1000 proceeds to determination step 1003.

At determination step 1003, the first array structured, referenced by the ROW variable from array INTERCEPTS, is checked to determine if any intercepts exists for the current ROW (i.e., If ROW<len(INTERCEPTS)). If there are no intercepts for the current row (i.e., is INTERCEPTS [ROW] is empty), then the method 1000 proceeds to step 1004. Otherwise, the method 1000 proceeds to filling step 1005.

At step 1004, the ROW variable is incremented by the processor 105, so that the ROW variable refers to the next row. The process from step 1004 then continues back to step 1002, where the ROW variable is verified to ensure that it is valid.

If at step 1003 the processor 105 determines that there exists intercepts for the current row, then the method 1000 continues to step 1005 where the intercepts are processed in order to fill the inside of the outline of the shape corresponding to the current row. A method 1100 of filling the inside of the outline of the shape, as executed at step 1005, will be described in detail below with reference to FIG. 11. The shape is defined by the path definition retrieved at step 202. Once step 1005 is performed, the method 1000 proceeds to step 1004 where the ROW variable is incremented, so the next row would be processed.

The method 1100 may be implemented as one or more code modules of the software application program 133 resident on the hard disk drive 110 and being controlled in its execution by the processor 105.

The method 1100 begins at setting step 1101, where an iterator variable I configured within RAM 106 is initialised to zero (0) (i.e., set I=0) by the processor 105. The variable I is used to iterate through each intercept value for the current row inside the INTERCEPTS array. Using the iterator variable I, the intercept entry is read from the INTERCEPTS array corresponding to the current ROW (i.e., (POS, STATE=INTERCEPTS[ROW][I]) at reading step 1102, and stored in variables POS and STATE configured within RAM 106. The value of the POS variable corresponds to the horizontal intercept position and the value of the STATE variable refers to a value of either ON or OFF as stored in prior steps 903 and 904.

Following step 1102, the method 1100 proceeds to determination step 1103 where the STATE variable is evaluated. If the value of the STATE variable is equal to ON (i.e, is STATE=ON?), then the method 1100 proceeds to step 1104. Otherwise, the method 1100 proceeds to step 1108.

At incrementing step 1104, the iterator variable I is incremented at step 1104. At the next reading step 1105, the iterator variable I is used to read the next intercept into variables POS_END and STATE (i.e., (POS_END, STATE)=INTERCEPTS[ROW][I]).

The updated STATE variable is evaluated at determination step 1106. If the processor 105 determines that the STATE variable configured within RAM 106 holds the value OFF (i.e., is STATE=OFF?), then the method 1100 continues to step 1107. Otherwise, the method 1100 proceeds to step 1110.

At filling step 1107, the processor 105 performs the step of filling a pixel span at the current ROW. Then at step 1108, the processor 105 is used to increment the iterator variable I which is used to refer to the next unprocessed intercept entry. After the incrementing of the iterator I variable, the value of the iterator variable I is checked at determination step 1109 to ensure that the iterator refers to a valid entry in the INTERCEPTS array for the current row (i.e., is I<length (INTERCEPTS[ROW]). If the iterator variable I is valid after the increment step 1108, then the method 1100 continues to step 1102 where the next intercept entry is read from the INTERCEPTS array. Otherwise, the process of filling in the intercepts for the current row is complete, and the flow continues back to step 1004 of the method 1000.

At determination step 1106, if the STATE variable, corresponding to a first entry in the INTERCEPTS array, is not equal to OFF, then the POS variable is updated at step 1110 to store the value from the POS_END variable (i.e., undate POS to POS_END) to be used as the starting intercept value for processing. Following step 1110, the method 1100 proceeds to the step 1108 of incrementing the iterator variable I.

If the STATE variable at step 1103, corresponding to the next intercept array following the first entry, was set to OFF, then the current intercept entry is invalid as the first entry read corresponds to an OFF intercept. In this case, the processing of the intercept is skipped, and the method 1100 continues to step 1108 where the iterator variable I is incremented in order to invoke processing of the next intercept value.

Figure 12:
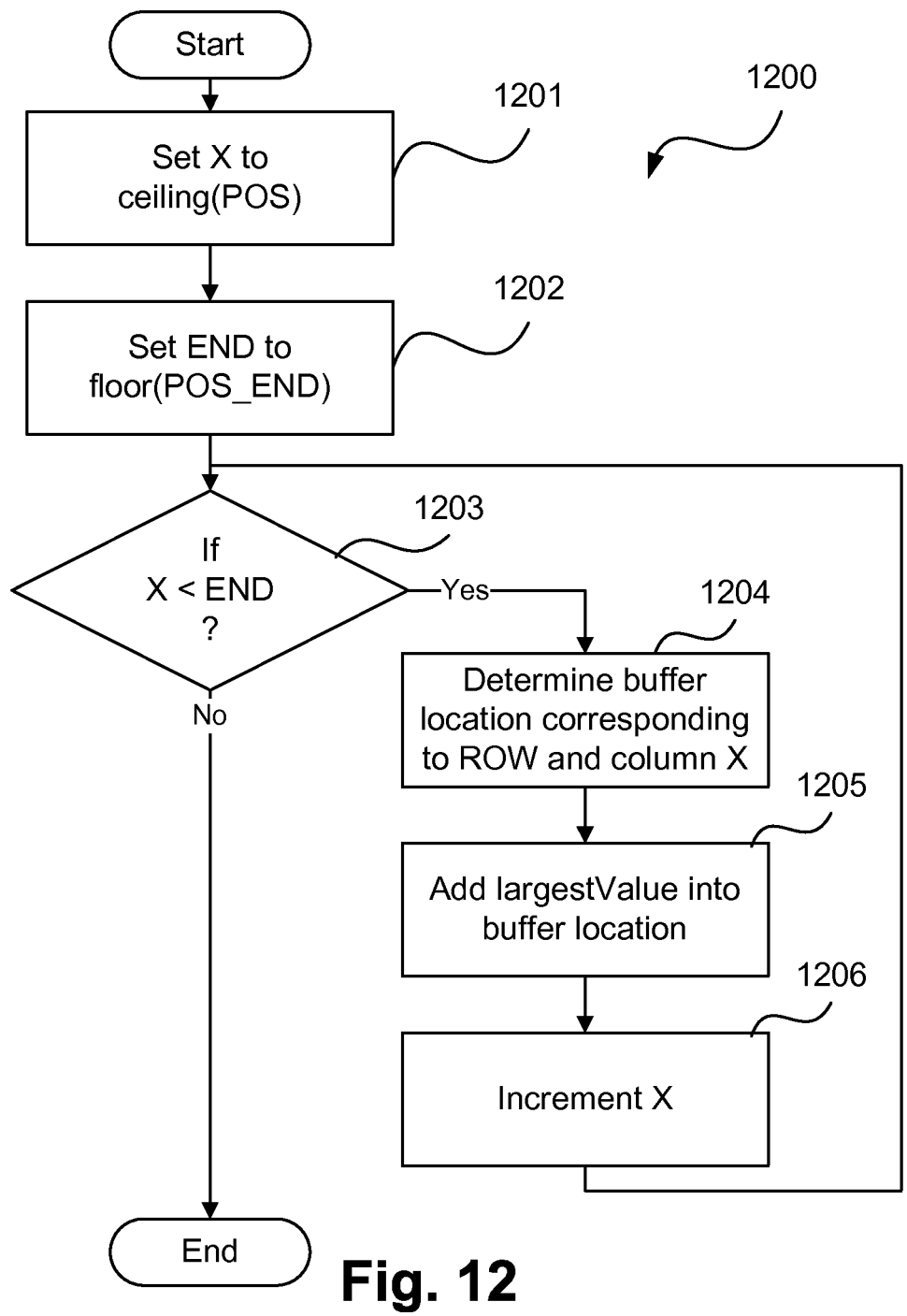
FIG. 12 is a schematic flow diagram showing a method of filling a span of pixels.

The method 1200 of filling the pixel span, as executed at step 1107, will now be described with reference to FIG. 12. The method 1200 may be implemented as one or more code modules of the software application program 133 resident on the hard disk drive 110 and being controlled in its execution by the processor 105.

From the intercepts retrieved at steps 1102 and 1105, two variables POS and POS_END are available within RAM 106. The POS and POS_END variables refer to the start and end intercept positions, respectively. However, as the values of the POS and POS_END variables contain fractional parts, the POS and POS_END variables refer to positions with fractional positions within a pixel.

The method 1200 begins at converting step 1201, where the processor 105 converts the value of the POS variable into an integer position by calculating the ceiling of the value in the POS variable and storing the calculated value in variable X configured within RAM 106 (i.e., set X to ceiling(POS)). The ceiling results in rounding up of the value of the POS variable to a next integer value, so that the POS variable refers to a next pixel position which corresponds to the first pixel to start filling in from.

Next, the method 1200 proceeds to step 1202, where the end position is calculated by converting the value of the POS_END variable to an integer position by calculating a floor value of the value of the POS_END variable (i.e., set END to floor(POS_END)) and storing the calculated value in the POS_END variable configured within RAM 106.

Following step 1202, the method 1200 proceeds to a determination step 1203. At step 1203, if the processor 105 determines that the value of the X variable is less than the value in the POS_END variable (i.e., if X<END), then the method 1200 continues to the next step 1204.

At determining step 1204, the processor 105 determines the buffer location corresponding to the current row ROW and column X. Then at following adding step 1205, the value of the largestValue variable is added to the determined buffer location. Following step 1205, the method 1200 proceeds to incrementing step 1206, where the X variable is incremented such that the X variable refers to the next column. Following step 1206, the method 1200 continues back to the determination step 1203 to validate that the value of the X variable is less than the value for the END variable.

If at determination step 1203, the processor 105 determines that the value of the X variable is not less than the value of the POS_END variable, then the span between the intercept has been filled and the method 1200 concludes, and the flow continues back to step 1108 of the method 1100.

Figure 16A:
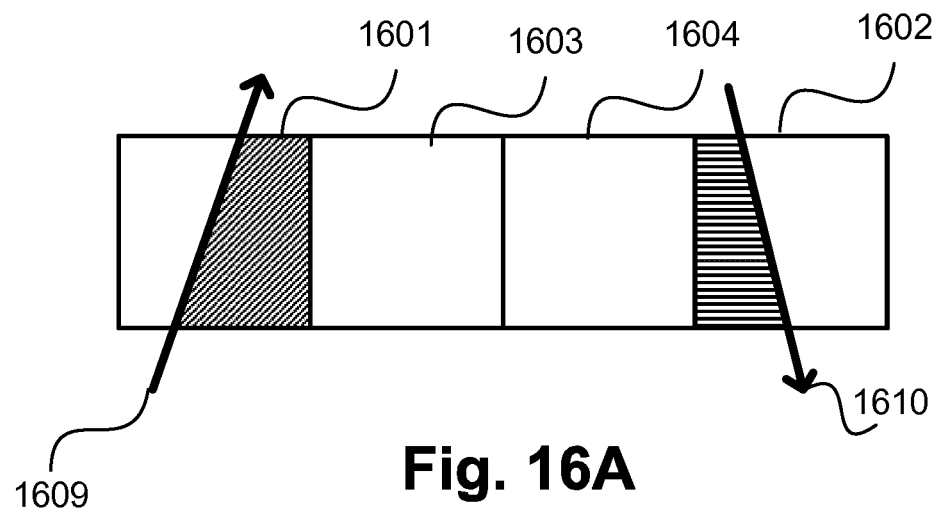
FIG. 16A is a diagram showing a row of pixels to be filled in accordance with the method of FIG. 12.

In one arrangement, inner pixels are filled using the addition operator. In one example, as shown in FIG. 16A, a row of pixels 1601, 1603, 1604 and 1602 is to be filled. The first pixel 1601 has an edge 1609 entering at the bottom side and exiting at the top side of the pixel 1601. The pixel 1602 has an edge 1610 entering at the top side of the pixel 1602 and exiting at the bottom side of the pixel 1602. Pixels 1603 and 1604 are unfilled. The unfilled pixels 1603 and 1604 are not intersected by any edge and have the value zero (0), as set during the initialisation step 303. The calculation of the starting fill pixel, as at step 1201, causes the first pixel with value zero (i.e., pixel 1603) to be the first pixel to be filled, which produces a result of largestValue, as a result of addition step 1205. As the variable X is incremented, as at step 1206, then the next pixel 1204 is filled in the same manner as the previous pixel. Filling is completed at a pixel corresponding to a pixel (i.e., pixel 1602) with a downwards heading edge 1610.

Figure 16B:
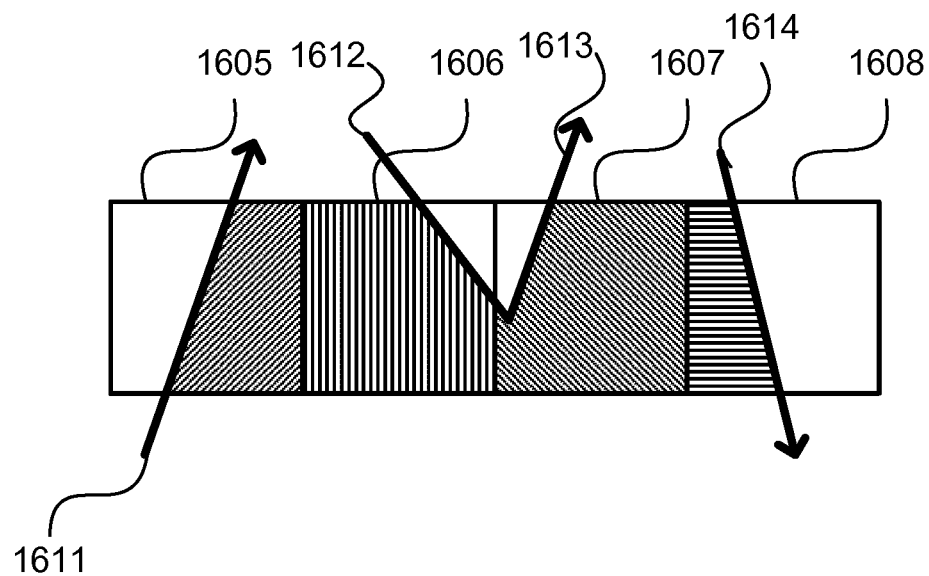
FIG. 16B is a diagram showing another row of pixels to be filled in accordance with the method of FIG. 12.

In another example, FIG. 16B shows a row of pixels 1605, 1606, 1607 and 1608 to be filled. The first pixel 1605 comprises an edge 1611 crossing from the bottom to top side of the pixel 1605. The pixel 1606 comprises an edge crossing from the top side of the pixel 1606 and then the right side of the pixel 1606. Then the next pixel 1607 comprises an edge 1613 crossing from the left side of the pixel 1607 and then the top side of the pixel 1607. Then the next pixel 1608 comprises an edge 1614 crossing the top of the pixel 1608 and then the bottom side of the pixel 1608. In the example of FIG. 16B, composed of a sequence of pixels 1605-1608, intercepts are generated only for the first pixel 1605 and the fourth pixel 1608 as the pixels 1605 and 1608 feature crossing from the top to the bottom or from the bottom to the top of the pixels 1605 and 1608. When filling the pixel span comprising pixels 1605, 1606, 1607 and 1608, as at step 1107, the in between pixels 1606 and 1607 are filled by adding largestValue into the buffer corresponding to the pixel locations as at step 1205. As the pixels 1606 and 1607 have existing values, adding the largestValue into the pixels 1606 and 1607 causes the values in the buffer to overflow and wrap around. By allowing the wrap around to occur, the addition of largestValue into the buffer causes the existing value to be decreased by one, thereby introducing an error of 1/largestValue. While the error causes the value stored in the buffer to be incorrect the error is within an acceptable tolerance and reduces the need for additional tests for each pixel to determine if the pixel contains a non-zero value, and also minimises the number of intercepts generated, thereby increasing performance.

In another arrangement of step 1205, the addition of the largestValue into the buffer location may be replaced with the step of testing if the pixel location is zero, and then setting the pixel value to largestValue. Such an arrangement can be used in the case when the buffer is utilising a type that does not support the wrapping property.

In another arrangement, a polygon filling method may be used at step 204 to fill the outline of the shape defined by the path definition.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of determining a coverage area of a pixel intersected by a scalable path definition for a character, the method comprising:
   determining a raster representation for the scalable path definition;
   storing the raster representation for the scalable path definition in a pixel buffer;
   initializing an intercepts array configured to have a sufficient number of entries for storing intercept values for each row in the raster representation;
   setting a value corresponding to a first horizontal pixel entry position;
   receiving an edge direction for each of a plurality of edges of the scalable path definition intersecting the pixel, the scalable path definition defining a non-self-overlapping shape;
   determining that an initial edge or a first edge entering pixel is upwards or downwards heading;
   if the initial edge or the first edge entering pixel is upwards heading and enters the pixel on a bottom side of the pixel, setting one or more variable directions to "UP" or zero (0) to indicate that the upwards heading initial edge or first edge entering pixel enters the pixel on the bottom side of the pixel, or, if the initial edge or first edge entering pixel is downwards heading and enters the pixel on a top side of the pixel, setting the one or more variable directions to "DOWN" or one (1) to indicate that the downwards heading initial edge or first edge entering pixel enters the pixel on the top side of the pixel;
   calculating and storing intercept values based on the set one or more variable directions;
   determining a fragment area for each of the plurality of edges, each of the fragment areas representing an area of the pixel located to a side of each of the plurality of edges including portions of the pixel covered and uncovered by the non-self-overlapping shape, the side being selected based on the edge direction for each of the plurality of edges of the scalable path definition intersecting the pixel; and
   determining the coverage area of the pixel based on a sum of the fragment areas, the sum of the fragment areas having a value greater than a total area of the pixel and exceeding the total area of the pixel by the coverage area.

2. The method according to claim 1, further comprising:
   configuring a buffer for storing the coverage area to use a predetermined number of bits; and
   storing least significant bits corresponding to the determined coverage area in the buffer, wherein the number of bits stored corresponds to the predetermined number.

3. The method according to claim 1, further comprising:
   configuring a buffer for storing the coverage area to store a predetermined value;
   determining a mask value that is equal to the predetermined value; and
   applying a bitwise mask operation using the mask value to the coverage area.

4. The method according to claim 1, further comprising subtracting a value corresponding to a total area of the pixel from the sum of the fragment areas to determine the coverage area.

5. The method according to claim 1, wherein the fragment area for each of the plurality of edges corresponds to an area of a polygon bounded by the edge, a side of the pixel entered by the edge and a side of the pixel exited by the edge.

6. The method according to claim 1, further comprising splitting one of the fragment areas into one or more trapezoid shapes.

7. The method according to claim 1, further comprising filling the coverage area of the pixel.

8. The method according to claim 7, further comprising generating one or more fill intercepts.

9. The method of claim 8, further comprising:
   determining whether there is one or more untraced edges remaining; and
   if it is determined that there is one or more untraced edges remaining, determining the next active pixel entered by the traced edge.

10. The method according to claim 1, further comprising:
    determining or setting a maximum value or maximum storable value able to be stored in the pixel buffer to be used to store the raster representation;
    configuring the pixel buffer to support values up to the determined or set maximum value or maximum storable value; and
    initializing the pixel buffer with zeros.

11. An apparatus for determining a coverage area of a pixel intersected by a scalable path definition for a character, the apparatus comprising:
    means for determining a raster representation for the scalable path definition;
    means for storing the raster representation for the scalable path definition in a pixel buffer;
    means for initializing an intercepts array configured to have a sufficient number of entries for storing intercept values for each row in the raster representation;
    means for setting a value corresponding to a first horizontal pixel entry position;
    means for receiving an edge direction for each of a plurality of edges of the scalable path definition intersecting the pixel, the scalable path definition defining a non-self-overlapping shape;
    means for determining that an initial edge or a first edge entering pixel is upwards or downwards heading;
    means for, if the initial edge or the first edge entering pixel is upwards heading and enters the pixel on a bottom side of the pixel, setting one or more variable directions to "UP" or zero (0) to indicate that the upwards heading initial edge or first edge entering pixel enters the pixel on the bottom side of the pixel, or, if the initial edge or first edge entering pixel is downwards heading and enters the pixel on a top side of the pixel, setting the one or more variable directions to "DOWN" or one (1) to indicate that the downwards heading initial edge or first edge entering pixel enters the pixel on the top side of the pixel;
    means for calculating and storing intercept values based on the set one or more variable directions;
    means for determining a fragment area for each of the plurality of edges, each of the fragment areas representing an area of the pixel located to a side of each of the plurality of edges including portions of the pixel covered and uncovered by the non-self-overlapping shape, the side being selected based on the edge direction for each of the plurality of edges of the scalable path definition intersecting the pixel; and
    means for determining the coverage area of the pixel based on a sum of the fragment areas, the sum of the fragment areas having a value greater than a total area of the pixel and exceeding the total area of the pixel by the coverage area.

12. A system for determining a coverage area of a pixel intersected by a scalable path definition for a character, the system comprising:
- a memory for storing a data and a computer program;
- a processor coupled to the memory for executing said program, said program comprising instructions for:
    - determining a raster representation for the scalable path definition;
    - storing the raster representation for the scalable path definition in a pixel buffer:
    - initializing an intercepts array configured to have a sufficient number of entries for storing intercept values for each row in the raster representation;
    - setting a value corresponding to a first horizontal pixel entry position;
    - receiving an edge direction for each of a plurality of edges of the scalable path definition intersecting the pixel, the scalable path definition defining a non-self-overlapping shape;
    - determining that an initial edge or a first edge entering pixel is upwards or downwards heading;
    - if the initial edge or the first edge entering pixel is upwards heading and enters the pixel on a bottom side of the pixel, setting one or more variable directions to "UP" or zero (0) to indicate that the upwards heading initial edge or first edge entering pixel enters the pixel on the bottom side of the pixel, or, if the initial edge or first edge entering pixel is downwards heading and enters the pixel on a top side of the pixel, setting the one or more variable directions to "DOWN" or one (1) to indicate that the downwards heading initial edge or first edge entering pixel enters the pixel on the top side of the pixel;
    - calculating and storing intercept values based on the set one or more variable directions;
    - determining a fragment area for each of the plurality of edges, each of the fragment areas representing an area of the pixel located to a side of each of the plurality of edges including portions of the pixel covered and uncovered by the non-self-overlapping shape, the side being selected based on the edge direction for each of the plurality of edges of the scalable path definition intersecting the pixel; and
    - determining the coverage area of the pixel based on a sum of the fragment areas, the sum of the fragment areas having a value greater than a total area of the pixel and exceeding the total area of the pixel by the coverage area.

13. A non-transitory computer readable medium having a computer program stored thereon for determining a coverage area of a pixel intersected by a scalable path definition for a character and for causing a computer to execute a method, the method comprising:
- determining a raster representation for the scalable path definition;
- storing the raster representation for the scalable path definition in a pixel buffer;
- initializing an intercepts array configured to have a sufficient number of entries for storing intercept values for each row in the raster representation;
- setting a value corresponding to a first horizontal pixel entry position;
- receiving an edge direction for each of a plurality of edges of the scalable path definition intersecting the pixel, the scalable path definition defining a non-self-overlapping shape;
- determining that an initial edge or a first edge entering pixel is upwards or downwards heading;
- if the initial edge or the first edge entering pixel is upwards heading and enters the pixel on a bottom side of the pixel, setting one or more variable directions to "UP" or zero (0) to indicate that the upwards heading initial edge or first edge entering pixel enters the pixel on the bottom side of the pixel, or, if the initial edge or first edge entering pixel is downwards heading and enters the pixel on a top side of the pixel, setting the one or more variable directions to "DOWN" or one (1) to indicate that the downwards heading initial edge or first edge entering pixel enters the pixel on the top side of the pixel;
- calculating and storing intercept values based on the set one or more variable directions;
- determining a fragment area for each of the intersecting plurality of edges, each of the fragment areas representing an area of the pixel located to a side of each of the plurality of edges including portions of the pixel covered and uncovered by the non-self-overlapping shape, the side being selected based on the edge direction for each of the plurality of edges of the scalable path definition intersecting the pixel; and
- determining the coverage area of the pixel based on a sum of the fragment areas, the sum of the fragment areas having a value greater than a total area of the pixel and exceeding the total area of the pixel by the coverage area.

* * * * *